United States Patent
Kiuchi

(10) Patent No.: US 7,602,419 B2
(45) Date of Patent: Oct. 13, 2009

(54) PHOTOGRAPHY MODE SETTING INFORMATION TRANSFER SYSTEM, AN IMAGING DEVICE, AN INFORMATION PROCESSOR FOR A PHOTOGRAPHY MODE SETTING INFORMATION TRANSFER SYSTEM AND RECORDING MEDIUM RECORDED PROGRAM

(75) Inventor: Toshihiro Kiuchi, Hachioji (JP)

(73) Assignee: Casio Computer Co., Ltd, Tokyo (JP)

( * ) Notice: Subject to any disclaimer, the term of this patent is extended or adjusted under 35 U.S.C. 154(b) by 829 days.

(21) Appl. No.: 10/869,669

(22) Filed: Jun. 15, 2004

(65) Prior Publication Data

US 2004/0263634 A1  Dec. 30, 2004

(30) Foreign Application Priority Data

Jun. 20, 2003  (JP) .............................. 2003-176552

(51) Int. Cl.
*H04N 5/232* (2006.01)
(52) U.S. Cl. ................................. 348/211.1; 348/211.5
(58) Field of Classification Search ................................. 348/211.99–211.14
See application file for complete search history.

(56) References Cited

U.S. PATENT DOCUMENTS

| | | | |
|---|---|---|---|
| 6,006,039 A * | 12/1999 | Steinberg et al. ............. | 396/57 |
| 6,163,816 A | 12/2000 | Scardino et al. | |
| 6,188,431 B1 * | 2/2001 | Oie .......................... | 348/211.5 |
| 6,670,984 B1 * | 12/2003 | Tanaka et al. ............... | 348/159 |
| 6,750,902 B1 | 6/2004 | Steinberg et al. | |
| 2001/0017655 A1 | 8/2001 | Araki | |
| 2002/0186303 A1 | 12/2002 | Yamagami et al. | |
| 2007/0252901 A1 * | 11/2007 | Yokonuma et al. ........ | 348/231.1 |

FOREIGN PATENT DOCUMENTS

| | | |
|---|---|---|
| EP | 0 883 276 A2 | 12/1998 |
| EP | 0 895 421 A2 | 2/1999 |
| JP | 2003-87802 A | 3/2003 |
| WO | WO 97/30375 | 8/1997 |

* cited by examiner

*Primary Examiner*—Sinh Tran
*Assistant Examiner*—Anthony J Daniels
(74) *Attorney, Agent, or Firm*—Frishauf, Holtz, Goodman & Chick, P.C.

(57) ABSTRACT

Photography mode setting information is transferred by transmitting from a first digital camera certain photography mode setting information set in the first digital camera through a communications means, such as a USB cable, and receiving the photography mode setting information transmitted from the first digital camera with a second digital camera. Prior to this transfer, by way of the first digital camera or the second digital camera, the model type information of the other digital camera is obtained, and the photography mode setting information set in the first digital camera is changed (converted) so that the setting information is appropriate for the second digital camera.

16 Claims, 12 Drawing Sheets

Fig. 4

| | SCENE | INFORMATION SETTABLE BY KEYS IN THE MENU | | | | | | | | | | | | | |
|---|---|---|---|---|---|---|---|---|---|---|---|---|---|---|---|
| | | FOCUS AF | SHUTTER SPEED | APERTURE | EV SHIFT | SPEED | FILTER | EXPOSURE MODE | PHOTOMETRY METHOD | WB | COLOR EMPHASIS | FLASH LIGHT VOLUME | SHARPNESS | COLOR SATURATION | CONTRAST | FLASH |
| 1 | PERSON(S) AND SCENERY 1 | AF (AREA 1) | AUTO | AUTO | 0 | STANDARD | × | P (NORMAL) | MULTI | AUTO | × | STANDARD | STANDARD | STANDARD | STANDARD | AUTO |
| 2 | PERSON(S) AND SCENERY 2 | AF (AREA 2) | AUTO | AUTO | 0 | STANDARD | × | P (NORMAL) | MULTI | AUTO | × | STANDARD | STANDARD | STANDARD | STANDARD | AUTO |
| 3 | CLOSE-UP | AF (AREA 3) | AUTO | AUTO | 0 | STANDARD | × | P (OPEN) | MULTI | AUTO | SKIN COLOR | STANDARD | <SOFT> | STANDARD | STANDARD | AUTO |
| 4 | BUST CLOSE-UP | AF (AREA 4) | AUTO | AUTO | 0 | STANDARD | × | P (OPEN) | MULTI | AUTO | SKIN COLOR | STANDARD | <SOFT> | STANDARD | STANDARD | AUTO |
| 5 | KNEE SHOT | AF (AREA 5) | AUTO | AUTO | 0 | STANDARD | × | P (OPEN) | MULTI | AUTO | SKIN COLOR | STANDARD | <SOFT> | STANDARD | STANDARD | AUTO |
| 6 | TWO-PERSONS SHOT | AF (AREA 6) | AUTO | AUTO | 0 | STANDARD | × | P (OPEN) | MULTI | AUTO | SKIN COLOR | STANDARD | STANDARD | STANDARD | STANDARD | AUTO |
| 7 | CLOSE-UP OF FLOWERS | MACRO | AUTO | AUTO | 0 | STANDARD | × | P (NORMAL) | MULTI | AUTO | × | WEAK | STANDARD | <HIGH> | STANDARD | AUTO |
| 8 | FLOWER FIELD | AF | AUTO | AUTO | 0 | STANDARD | × | P (NORMAL) | CENTRAL EMPHASIS | AUTO | × | STANDARD | STANDARD | <HIGH> | STANDARD | AUTO |
| 9 | FOREST | AF | AUTO | AUTO | −1 | STANDARD | × | P (NORMAL) | MULTI | AUTO | GREEN | STANDARD | <HARD> | <HIGH> | STANDARD | AUTO |
| 10 | AUTUMN LEAVES | AF | AUTO | AUTO | 0 | STANDARD | × | P (NORMAL) | MULTI | AUTO | RED | STANDARD | <HARD> | <HIGH> | STANDARD | AUTO |
| 11 | BLUE SKY | ∞ | AUTO | AUTO | 0 | STANDARD | × | P (NORMAL) | MULTI | AUTO | BLUE | STANDARD | STANDARD | STANDARD | STANDARD | AUTO |
| 12 | SUNSET | ∞ | AUTO | AUTO | 0 | STANDARD | RED | P (NORMAL) | MULTI | FIXED (SUNLIGHT) | × | STANDARD | STANDARD | <HIGH> | STANDARD | AUTO |
| 13 | SUMMER OCEAN | AF | AUTO | AUTO | 1 | STANDARD | × | P (NORMAL) | CENTRAL EMPHASIS | AUTO | BLUE | STANDARD | STANDARD | STANDARD | STANDARD | AUTO |

Fig. 5

| | | | | | | | | | | | | | | | | | |
|---|---|---|---|---|---|---|---|---|---|---|---|---|---|---|---|---|---|
| 14 | NIGHT SCENE | ∞ | AUTO | AUTO | 0 | | × | P (NIGHT SCENE) | CENTRAL EMPHASIS | FIXED (SUNLIGHT) | × | | | | | | |
| 15 | SLOW SYNCHRO 1 | AF (AREA 15) | AUTO | AUTO | 0 | STANDARD | × | P (NIGHT SCENE) | CENTRAL EMPHASIS | FIXED (SUNLIGHT) | × | STANDARD | STANDARD | STANDARD | STANDARD | OFF |
| 16 | SLOW SYNCHRO 2 | AF (AREA 16) | AUTO | AUTO | 0 | STANDARD | × | P (NIGHT SCENE) | CENTRAL EMPHASIS | FIXED (SUNLIGHT) | × | STANDARD | STANDARD | STANDARD | STANDARD | OFF |
| 17 | FIREWORK | ∞ | OPEN | OPEN | 0 | STANDARD | × | M | CENTRAL EMPHASIS | FIXED (SUNLIGHT) | × | STANDARD | STANDARD | STANDARD | STANDARD | OFF |
| 18 | NIGHT SKY | ∞ | OPEN | OPEN | 0 | STANDARD | × | M | CENTRAL EMPHASIS | FIXED (SUNLIGHT) | × | STANDARD | STANDARD | STANDARD | STANDARD | OFF |
| 19 | LIGHT TRACE | ∞ | OPEN | LENS STOP-DOWN | 0 | STANDARD | × | M | CENTRAL EMPHASIS | FIXED (SUNLIGHT) | × | STANDARD | STANDARD | STANDARD | STANDARD | OFF |
| 20 | FLOWING WATER | AF | 1/2 | LENS STOP-DOWN | 0 | STANDARD | × | M | CENTRAL EMPHASIS | AUTO | × | STANDARD | <SOFT> | <HIGH> | STANDARD | AUTO |
| 21 | STILL WATER | AF | 1/1000~ | AUTO | 0 | STANDARD | × | S | CENTRAL EMPHASIS | AUTO | × | STANDARD | <HARD> | <HIGH> | STANDARD | AUTO |
| 22 | ACTION | AF | 1/1000~ | AUTO | 0 | STANDARD | × | S | CENTRAL EMPHASIS | AUTO | × | STANDARD | STANDARD | <HIGH> | STANDARD | AUTO |
| 23 | BUILDING | AF | AUTO | AUTO | 0 | STANDARD | × | P (CLOSE) | MULTI | AUTO | × | STANDARD | <HARD> | <HIGH> | STANDARD | AUTO |
| 24 | FOOD | MACRO | AUTO | AUTO | 0 | STANDARD | × | P (NORMAL) | MULTI | AUTO | × | WEAK | STANDARD | STANDARD | STANDARD | AUTO |
| 25 | CUSTOM 1 | | | | | | | | | | | | | | | |
| 26 | CUSTOM 2 | | | | | | | | | | | | | | | |
| 27 | CUSTOM 3 | | | | | | | | | | | | | | | |
| 28 | CUSTOM 4 | | | | | | | | | | | | | | | |
| 29 | CUSTOM 5 | | | | | | | | | | | | | | | |

Fig. 6

| | SHUTTER SPEED | APERTURE (F VALUE) | EV SHIFT | WHITE BALANCE | FLASH LIGHT VOLUME | COLOR EMPHASIS | CONTRAST | SHARPNESS |
|---|---|---|---|---|---|---|---|---|
| DIGITAL CAMERA 10 | 2.0 SEC | F8 | 0 | RED EMPHASIS +10% | 90% | SKIN COLOR 15% | + 4 UNITS | + 5 UNITS |
| DIGITAL CAMERA 20 | 1.8 SEC | F8 | 0 | RED EMPHASIS +15% | 85% | SKIN COLOR 10% | +5 UNITS | + 6 UNITS |

Fig. 7

| DIGITAL CAMERA 10 | DIGITAL CAMERA 20 |
|---|---|
| RED +5% | RED +4.5% |
| RED +10% | RED +9% |
| RED +15% | RED +13.5% |
| RED +20% | RED +18% |
| RED +25% | RED +22.5% |
| RED +30% | RED +27% |
| RED +35% | RED +31.5% |
| RED +40% | RED +36% |
| . | . |
| . | . |
| . | . |
| GREEN +5% | GREEN +4.5% |
| GREEN +10% | GREEN +9% |
| GREEN +15% | GREEN +13.5% |
| GREEN +20% | GREEN +18% |
| GREEN +25% | GREEN +22.5% |
| GREEN +30% | GREEN +27% |
| GREEN +35% | GREEN +31.5% |
| GREEN +40% | GREEN +36% |
| . | . |
| . | . |
| . | . |

PHOTOGRAPHY MODE SETTING INFORMATION TRANSFER SYSTEM, AN IMAGING DEVICE, AN INFORMATION PROCESSOR FOR A PHOTOGRAPHY MODE SETTING INFORMATION TRANSFER SYSTEM AND RECORDING MEDIUM RECORDED PROGRAM

CROSS-REFERENCE TO RELATED APPLICATION

This application is based upon and claims the benefit of priority from the prior Japanese Patent Application No. 2003-176552, filed Jun. 20, 2003, the entire contents of which is incorporated herein by reference.

BACKGROUND OF THE INVENTION

1. Field of the Invention

The present invention relates to a photography mode setting information transfer system, an imaging device, an information processor for a photography mode setting information transfer system and recording medium recorded program.

2. Description of the Related Art

Conventionally, a color imaging device which regulates the white balance, each color component and the like according to a user's preference has been disclosed.

To provide such a color imaging device wherein the control result of the white balance is changed according to the user's taste and the varied hue is reflected in the acquired color image, the color imaging device comprises a lens which condenses the optical image of an object, a converging section which focuses the flux of light, a Charged Coupled Device (CCD) which performs photoelectric conversion of the optical image, a Correlated Double Sampler (CDS) which diminishes the noise contained in the CCD, an Analog/Digital (A/D) converter which converts the analog signal to a digital signal, a timing generator which generates timing, a digital signal processing circuit which performs image processing according to the image data processing parameters, a frame memory which stores images, a display section which displays the snapshot images, an image compression and expansion circuit which compresses or expands image data processed in the digital signal processing circuit 7, a memory card which stores compressed image data, a microcomputer which executes predetermined control based on a control program, an Electrically Erasable Programmable (EEP) table memory which stores parameters, a camera operation section provided with a release button and the like, an On-Screen Display (OSD) which monitors the film number and light generation state of the flash means and a selection means (strobe) which illuminates the photographic object.

SUMMARY OF THE INVENTION

In prior art, a user can perform various settings in the color imaging device according to preferences. However, when the user attempts photography with matching preferences using another color imaging device, the various settings need to be manually performed again in the additional color imaging device which is a troublesome task.

Further, when the model types of the color imaging devices differ from the variations in color imaging device specifications and the like, the prepared settings in the color imaging devices are also likely to be different. For example, in the case of the best setting for photographing a night view, the contents of the detailed setup information, such as the white balance in the night view mode, will vary.

Accordingly, the photography mode setting information between color imaging devices in the same photographing mode typically differ. Thus, if the same contents of the setup information set in one color imaging device are set into a second color imaging device and a photograph is taken with the second color imaging device, the photographed image will have different preferences. As a result, the setup information has to be separately changed corresponding to the model type of the second color imaging device.

Therefore, it is an object of the present invention to provide a photography mode setting information transfer system and an imaging device which can transfer various settings automatically by a command from one imaging device to a different imaging device instead of being performing manually.

A second object of the present invention is to provide a photography mode setting information transfer system and an imaging device which can transfer settings corresponding to differences in model type specifications and the like between imaging devices.

To achieve the above-mentioned objects, a photography mode setting information transfer system according to a first invention is a photography mode setting information transfer system, which transfers photography mode setting information by transmitting photography mode setting information set in a first imaging device from the first imaging device and receiving the photography mode setting information transmitted from the first imaging device with a second imaging device, and the first imaging device comprises a storage means which stores compatible conversion values of photography mode setting information corresponding to model types and the model type of the imaging device; a command means which commands transmission of the model type of a second imaging device to the second imaging device side; a conversion means which reads the conversion values from the storage means corresponding to the model type transmitted from the second imaging device side according to a command from the command means and which converts the photography mode setting information set in the first imaging device into photography mode setting information that can be applied to the second imaging device based on appropriate conversion values; and a setting information transmission means which transmits photography mode setting information converted by the conversion means to the second imaging device; and the second imaging device comprises a model type transmission means which transmits the model type of the second imaging device to the first imaging device according to a command from the command means; a receiving means which receives photography mode setting information transmitted by the setting information transmission means; and an updating means which updates the setting information of the second imaging device to the photography mode setting information received by the receiving means.

According to the first invention, the photography mode setting information set in the first imaging device is transmitted to the second imaging device. Therefore, it is not necessary to manually perform various settings in the second imaging device.

Further, the photography mode setting information set in the first imaging device is converted in the first imaging device corresponding to the model type of the second imaging device, and the converted setting information is transmitted to the second imaging device. Therefore, it becomes possible to perform settings corresponding to different model types between the first imaging device and the second imaging device.

A photography mode setting information transfer system according to a second invention is a photography mode setting information transfer system, which transfers the photography mode setting information set as the first imaging device by transmitting from the first imaging device and receiving the photography mode setting information transmitted from the first imaging device with a second imaging device, and the first imaging device comprises a setting information transmission means which transmits the photography mode setting information set as the first imaging device to the second imaging device according to a command from the second imaging device side; a model type transmission means which transmits the model type of the first imaging device to the second imaging device side according to a command from the second imaging device side; and the second imaging device comprises a storage means which stores compatible conversion values of the photography mode setting information corresponding to model types and the model type of the imaging device; a command means which commands the first imaging device to transmit the photography mode setting information set in the first imaging device and the model type of the first imaging device; a setting information receiving means which receives the photography mode setting information transmitted from the setting information transmission means; a model type receiving means which receives the model type transmitted from the model type transmission means; a conversion means which reads the conversion values from the storage means corresponding to the model type received by the model type receiving means and which converts the photography mode setting information of the first imaging device received by the setting information receiving means into photography mode setting information which can be applied to the second imaging device based on appropriate conversion values; and an updating means which updates the setting information of the second imaging device to the photography mode setting information converted by the conversion means.

According to the second invention, the photography mode setting information set in the first imaging device is transmitted to the second imaging device. Therefore, it is not necessary manually perform various settings in the second imaging device.

Further, the photography mode setting information set in the first imaging device is converted in the second imaging device correspondingly to the model type of the second imaging device. Therefore, it is possible to perform settings corresponding to different model types between the first imaging device and the second imaging device.

A photography mode setting information transfer system according to a third invention is a photography mode setting information transfer system, which transfers the photography mode setting information set as the first imaging device by transmitting from the first imaging device to an information processor, which after converting the photography mode setting information set as the first imaging device into photography mode setting information that can be applied to the second imaging device based on appropriate conversion values by the information processor is transmitted to the second imaging device;the first imaging device comprises a setting information transmission means which transmits the photography mode setting information set in the first imaging device to the information processor side according to a command from the information processor side; and a model type transmission means which transmits the model type of the first imaging device to the information processor side according to a command from the information processor side; the information processor comprises a storage means which stores compatible conversion values of the photography mode setting information according to each model type as well as the transmission destination of the photography mode setting information and the model type of each imaging device transmission destination; a prompting means which prompts transmission of the photography mode setting information set in the first imaging device to the first imaging device side and the model type of the first imaging device; a command means which commands transmission of the model type of the second imaging device to the second imaging device side; a conversion means which reads the conversion values from the storage means corresponding to the model type of the first imaging device transmitted according to prompting by the prompting means and the model type of the second imaging device transmitted according to a command by the command means and which converts the photography mode setting information set in the first pickup device into photography mode setting information that can be applied to the second imaging device based on appropriate conversion values; and a transmission means which transmits the photography mode setting information converted by the conversion means to the second imaging device side; the second imaging device comprises a model type transmission means which transmits the model type of the second imaging device to the information processor side according to a command from the command means; a receiving means which receives the photography mode setting information transmitted by the transmission means; and an updating means which updates the setting information of the second imaging device to the photography mode setting information received by the receiving means.

According to the third invention, the photography mode setting information set in the first imaging device is transmitted to the second imaging device. Therefore, it is not necessary to manually perform various settings in the second imaging device.

Further, the photography mode setting information set in the first imaging device is converted correspondingly to the model type of the second imaging device at the information processor, and the converted setting information is transmitted to the second imaging device. Therefore, it is possible to perform settings corresponding to different model types between the first imaging device and the second imaging device.

A photography mode setting information transfer system according to a fourth invention is the photography mode setting information transfer system according to any of the first to third inventions, wherein the photography mode setting information includes photography mode setting information customized for at least the first imaging device.

According to the fourth invention, the photography mode setting information set by a user in the first imaging device is transmitted to the second imaging device. Therefore, it is not necessary that the user manually perform various settings of the photography mode setting information in the second imaging device.

A photography mode setting information transfer system according to a fifth invention is the photography mode setting information transfer system according to any of the first to fourth inventions, wherein the first imaging device and the second imaging device are connected by using any of USB, infrared, or cable/wireless LAN.

According to the fifth invention, the first imaging device and the second imaging device are connected through the universal connection medium. Therefore, transfer of photography mode setting information can be conducted inexpensively.

An imaging device according to a sixth invention is an imaging device comprising a storage means which stores compatible conversion values of photography mode setting information according to model types and the model type of the imaging device; a command means which commands transmission of the model type of other imaging devices to other imaging devices; a conversion means which reads the conversion values from the storage means corresponding to the model type transmitted from other imaging devices according to a command from the command means and which converts the photography mode setting information set in an auto-imaging device into photography mode setting information that can be applied to other imaging devices based on appropriate conversion values; and a setting information transmission means which transmits the photography mode setting information converted by the conversion means to other imaging devices.

According to the sixth invention, the photography mode setting information set in the imaging device can be transmitted to other imaging devices. Therefore, it is unnecessary to manually perform various settings in the other imaging devices.

Further, the photography mode setting information set in the imaging device can be transmitted to other imaging devices after the photography mode setting information set in the imaging device is converted corresponding to the model type of the other imaging device. Therefore, it is possible to perform settings corresponding to different model types between imaging devices.

An imaging device according to a seventh invention is an imaging device comprising a model type transmission means which transmits the model type of a self-imaging device to other imaging devices according to a command from other imaging devices; a receiving means which receives photography mode setting information converted by other imaging devices based on the model type transmitted by the model type transmission means; and an updating means which updates the setting information of a self-imaging device to the photography mode setting information received by the receiving means.

According to the seventh invention, the photography mode setting information set in other imaging devices can be received by the imaging device. Therefore, it is not necessary to manually perform various settings in the imaging device.

Further, photography mode setting information set in other imaging devices is converted in the other imaging devices to the photography mode setting information corresponding to the model type of the imaging device, and then the converted setting information is transmitted to the imaging device. Therefore, it is possible to perform settings corresponding to different model types between imaging devices.

An imaging device according to an eighth invention is an imaging device comprises a setting information transmission means which transmits the photography mode setting information set in a self-imaging device to other imaging devices according to a command from other imaging devices; and a model type transmission means which transmits the model type of a self-imaging device to other imaging devices according to a command from other imaging devices.

According to the eighth invention, the photography mode setting information set in the imaging device can be transmitted to other imaging devices. Therefore, it is not necessary to manually perform various settings in the other imaging devices.

Further, when the photography mode setting information is transferred, the photography mode setting information set in the imaging device and the model type of the imaging device can be transmitted together to other imaging devices. Therefore, the processing load is lessened.

An imaging device according to a ninth invention is an imaging device comprising a storage means which stores compatible conversion values of the photography mode setting information corresponding to model types and the model type of the imaging device; a command means which commands transmission of the photography mode setting information and the model type of other imaging devices set in other imaging devices to the other imaging devices; a setting information receiving means which receives the photography mode setting information transmitted from other imaging devices according to a command by the command means; a model type receiving means which receives the model type transmitted from other imaging devices according to a command by the command means; a conversion means which reads the conversion values from the storage means corresponding to the model type received by the model type receiving means and which converts the photography mode setting information of other imaging devices received by the setting information receiving means into photography mode setting information that can be applied to a self-imaging device based on appropriate conversion values; and an updating means which updates the setting information of a self-imaging device to the photography mode setting information converted by the conversion means.

According to the ninth invention, the photography setting information set in other imaging devices can be received by the imaging device. Therefore, it is not necessary to manually perform various settings in the imaging device.

Further, the photography mode setting information set in the other imaging device is converted corresponding to the model type of the imaging device. Therefore, it is possible to perform settings corresponding to different model types between imaging devices.

An imaging device according to a tenth invention is an imaging device comprising a setting information transmission means which transmits the photography mode setting information set as the self-imaging device to an information processor according to a command from the information processor; and a model type transmission means which transmits the model type of a self-imaging device to the appropriate information processor according to a command from the information processor.

According to the tenth invention, when the photography mode setting information is transferred, the photography mode setting information set in the imaging device and the model type of the imaging device can be transmitted together to the information processor. Therefore, processing load can be lessened.

An imaging device according to an eleventh embodiment is an imaging device comprising a model type transmission means which transmits the model type of a self-imaging device to the information processor according to a command from the information processor; a receiving means which receives photography mode setting information set in other imaging devices which is converted by the information processor based on the model type transmitted from the model type transmission means; and an updating means which updates the setting information of a self-imaging device to the photography mode setting information received by the receiving means.

According to the eleventh embodiment, when the photography mode setting information is transferred, the photography mode setting information corresponding to the model type of the imaging device can be transmitted from the information processor. Therefore, it is possible to perform settings corresponding to different model types between imaging devices.

An information processor for a photography mode setting information transfer system according to a twelfth invention is an information processor for photography mode setting information transfer system comprising a storage means which stores compatible conversion values of the photography mode setting information according to each model type as well as the transmission destination of the photography mode setting information and the model type of each imaging device transmission destination; a prompting means which prompts transmission of the photography mode setting information set in a first imaging device to the first imaging device and the model type of the appropriate first imaging device; a command means which commands transmission of the model type of a second imaging device to the second imaging device; a conversion means which reads the conversion values from the storage means corresponding to the model type of the first imaging device transmitted according to prompting by the prompting means and the model type of the second imaging device transmitted according to a command by the command means, and which converts the photography mode setting information set in the first imaging device into the photography mode setting information that can be applied to the second imaging device based on appropriate conversion values; and a transmission means which transmits the photography mode setting information converted by the conversion means to the second imaging device.

According to the twelfth invention, the photography mode setting information set in the first imaging device is converted corresponding to the model type of the second imaging device, and then the converted setting information is transmitted to the second imaging device. Therefore, it is not necessary to manually perform various settings in the second imaging device.

Further, the photography mode setting information set in the first imaging device is converted corresponding to the model type of the second imaging device, and then the converted setting information is transmitted to the second imaging device. Therefore, it is possible to perform settings corresponding to different model types between the first imaging device and the second imaging device.

A recording medium according to a thirteen invention is a recording medium in which a recorded program is executed by a computer comprising a step which stores the model types of imaging devices and the conversion values of the photography mode setting information corresponding to the model types; a step which commands other imaging devices to transmit the model type of the other imaging devices; a step which reads the conversion values from the storage means corresponding to the model types transmitted from other imaging devices according to a command and which converts the photography mode setting information set in a self-imaging device into photography mode setting information that can be applied to other imaging devices based on appropriate conversion values; and a step which transmits converted photography mode setting information to other imaging devices.

A recording medium according to a fourteenth invention is a recording medium in which a recorded program is executed by a computer comprising a step which transmits the model type of a self-imaging device to other imaging devices according to a command from other imaging devices; a step which receives the photography mode setting information converted by other imaging devices based on the transmitted model types; and a step which updates the setting information of a self-imaging device to the received photography mode setting information.

A recording medium according to a fifteenth invention is a recording medium in which a recorded program is executed by a computer comprising a step which transmits the photography mode setting information set in a self-imaging device according to a command from other imaging devices; and a step which transmits the model type of a self-imaging device to other imaging devices according to a command from other imaging devices.

A recording medium according to a sixteenth invention is a recording medium in which a recorded program is executed by a computer comprising a step which stores compatible model types of imaging devices and the conversion values of the photography mode setting information corresponding to the model types; a step which commands transmission of the photography mode setting information and the model types of appropriate other imaging devices set in other imaging devices to other imaging devices; a step which receives the photography mode setting information transmitted from other imaging devices according to a command; a step which receives the model types transmitted from other imaging devices according to a command; a step which reads the conversion values from the storage means corresponding to the received model type and which converts the received photography mode setting information of other imaging devices into photography mode setting information that can be applied to self-imaging devices based on appropriate conversion values; and a step which updates the setting information of a self-imaging device to the converted photography mode setting information.

A recording medium according to a seventeenth invention is a recording medium in which a recorded program is executed by a computer comprising a step which transmits the photography mode setting information set in a self-imaging device to the appropriate information processor according to a command from the information processor; and a step which transmits the model type of a self-imaging device to the appropriate information processor according to a command from the information processor.

A recording medium according to a eighteenth invention is a recording medium in which a recorded program is executed by a computer comprising a step which transmits the model type of a self-imaging device to the information processor according to a command from the information processor; a step which receives the photography mode setting information set in other imaging devices which is converted by the information processor based on the transmitted model types; and a step which updates setting information of a self-imaging device to the received photography mode setting information.

A recording medium according to a nineteenth invention is a recording medium in which a recorded program is executed by a computer comprising a step which stores compatible conversion values of the photography mode setting information according to each model type as well as the transmission destination of the photography mode setting information and the model type of each imaging device transmission destination; a step which prompts transmission of the photography mode setting information set in the first imaging device to the first imaging device and the model type to the appropriate first imaging device; a step which commands transmission of the model type of a second imaging device to the second imaging device; a step which reads the conversion values from the storage means corresponding to the model type of the first imaging device transmitted according to prompting and the model type of the second imaging device transmitted according to a command and which converts the photography mode setting information set in the first imaging device into photography mode setting information that can be applied to the second imaging device based on appropriate conversion values; and a step which transmits the converted photography mode setting information to the second imaging device.

A photography mode setting information transfer method according to a twentieth invention includes a step which stores compatible model types of imaging devices and the conversion values of the photography mode setting information corresponding to the model types; a step which commands transmission of the model types of other imaging devices to other imaging devices; a step which receives the model types transmitted from other imaging devices according to a command; a step which reads the conversion values from the storage means corresponding to the model types received from other imaging devices; a step which converts the received photography mode setting information set in a self-imaging device into photography mode setting information that can be applied to other imaging devices based on appropriate conversion values; and a step which transmits the converted photography mode setting information to other imaging devices.

A photography mode setting information transfer method according to a twenty-first invention includes a step which stores compatible model types of imaging devices and the conversion values of the photography mode setting information corresponding to the model types; a step which commands transmission of the model types of the photography mode setting information set in other imaging devices to other imaging devices; a step which receives the photography mode setting information transmitted from other imaging devices according to a command; a step which receives the model types transmitted from other imaging devices according to a command; a step which reads the conversion values from the storage means corresponding to the received model types; a step which converts the received photography mode setting information of other imaging devices into photography mode setting information that can be applied to a self-imaging device based on appropriate conversion values; and a step which updates the setting information of a self-imaging device to the converted photography mode setting information.

A photography mode setting information transfer method according to a twenty-second invention includes a step which stores compatible conversion values of the photography mode setting information according to each model type as well as the transmission destination of the photography mode setting information and the model type of each imaging device transmission destination; a step which prompts transmission of the photography mode setting information set in the first imaging device to the first imaging device and the model type to the appropriate first imaging device; a step which commands transmission of the model type of a second imaging device to the second imaging device; a step which receives the model type of the first imaging device transmitted according to a prompt; a step which receives the model type of the second imaging device transmitted according to a command; a step which reads the conversion values from the storage means corresponding to the model type of the first imaging device and the model type of the second imaging device; a step which converts the photography mode setting information set in a first imaging device into photography mode setting information that can be applied to the second imaging device based on appropriate conversion values; and a step which transmits the converted photography mode setting information to the second imaging device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a drawing showing example settings of the photography mode setting information of the digital camera 10 shown in FIG. 1 and the like;

FIG. 5 is a drawing showing example settings of the photography mode setting information of the digital camera 10 shown in FIG. 1 and the like;

FIG. 6 is a drawing showing an example setting of the setup information related to scene "25: NIGHT SCENE 2" the user set as "25: CUSTOM 1" shown in FIG. 5;

FIG. 7 is a drawing showing a conversion table example which is referred to when converting the color enhancement setup information set in the digital camera 10 as shown in FIG. 1 and the like into color enhancement that can be applied to the digital camera 20;

DETAILED DESCRIPTION OF THE PREFERRED EMBODIMENTS

Hereinafter, the embodiments of the present invention will be explained with reference to the drawings.

First Embodiment

Description of the Configuration

Figure 1:
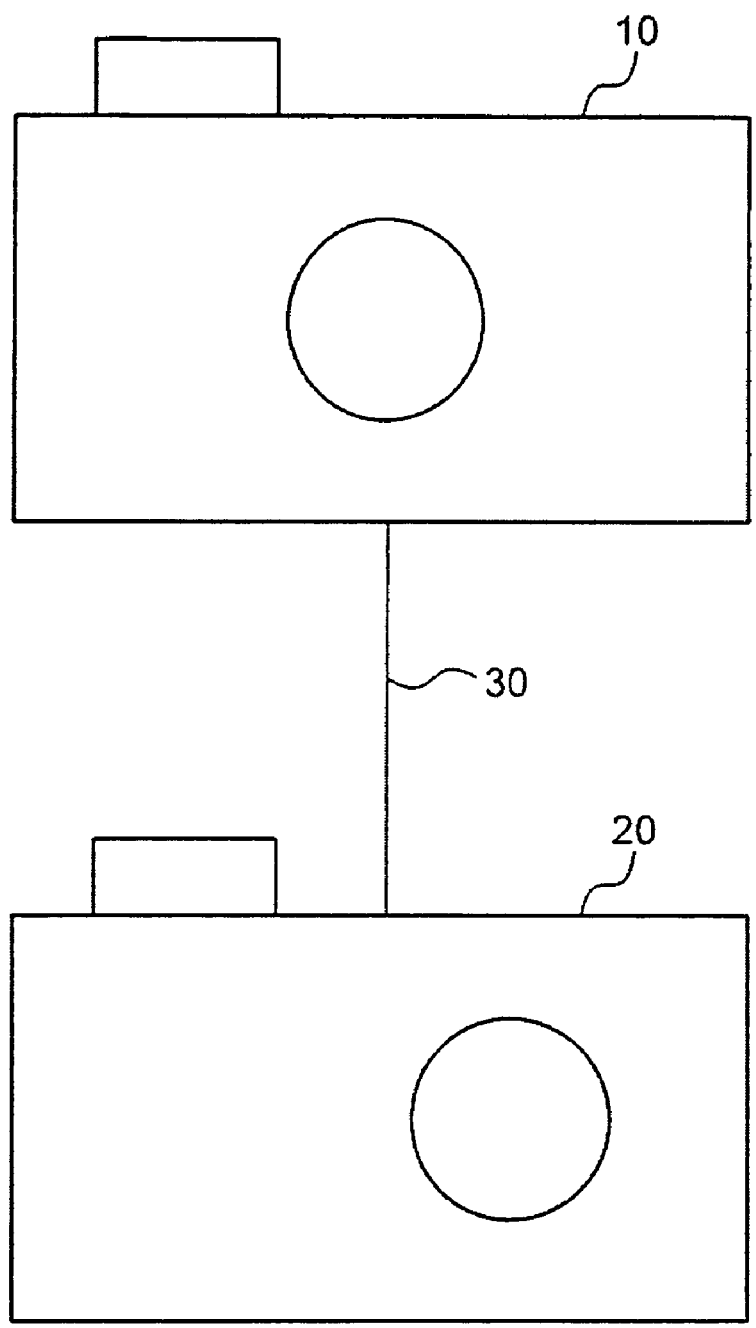
FIG. 1 is a schematic diagram of the photography mode setting information transfer system according to the first embodiment of the present invention.

FIG. 1 is a schematic diagram of the photography mode setting information transfer system according to the first embodiment of the present invention.

FIG. 1 shows the photography mode setting information transfer system. Photography mode setting information is transferred by receiving the photography mode setting information transmitted from a digital camera 10 with a digital camera 20. The photography mode setting information set in the digital camera 10 is transmitted via a USB cable 30 from the digital camera 10.

In addition, the USB cable 30 can be substituted with infrared, cable/wireless Local Area Network and the like to make the connection between the digital camera 10 and the digital camera 20. The photography mode is the mode in which various settings described later are executed to perform appropriate photography depending on a photographic scene. Also, details of the photography modes and setting information will be explained using FIG. 4.

Figure 2:
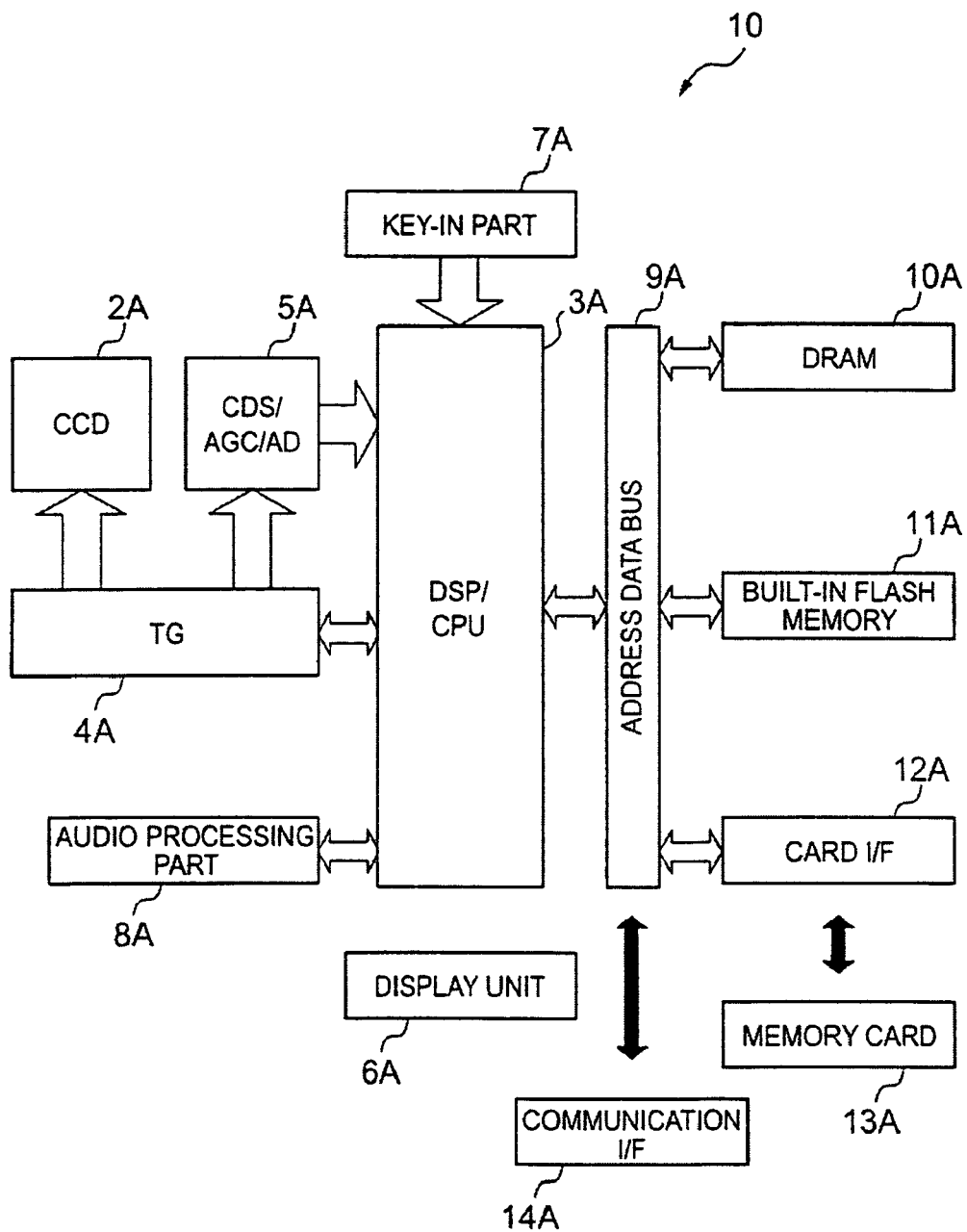
FIG. 2 is a block diagram showing the exemplary internal configuration of the digital camera 10 shown in FIG. 1.

FIG. 2 is a block diagram showing the exemplary internal configuration of the digital camera 10 shown in FIG. 1. The internal configuration of the digital camera 20 is equivalent to the digital camera 10.

In FIG. 2, the digital camera 10 comprises a CCD image pickup device (CCD) 2A, a DSP (Digital Signal Processor)/CPU 3A, a timing generator (TG) 4A, a unit circuit (CDS/AGC/AD) 5A, a display unit 6A, a key-in part 7A, an audio processing part 8A, an address data bus 9A, a DRAM 10A, a built-in flash memory 11A, a card interface (I/F) 12A, a memory card 13A and a communication I/F 14A.

The CCD image pickup device 2A converts the optical signals from the photographic objects into image signals, and outputs the converted image signals to the CDS/AGC/AD 5A according to timing signals outputted from the timing generator 4A.

The unit circuit 5A comprises a CDS which performs correlation double sampling and holds the image signals outputted from the CCD image pickup device 2A according to timing signals outputted from the timing generator 4A; an AGC which amplifies the gain of the image signals held in the CDS and an AD which converts the image signals amplified by the AGC from analog signals to digital signals. The image signals converted into digital signals are outputted to the DSP/CPU 3A. The timing generator (TG) 4A outputs timing signals to the CCD image pickup device 2A and the unit circuit 5A according to reference clock signals outputted from the DSP/CPU 3A.

The audio processing part 8A comprises a built-in microphone which inputs sound at the shooting location and the like, an amplifier which amplifies the audio inputted with the built-in microphone and a built-in speaker which outputs audio stored in the memory card 13A. The amplified audio signals are outputted to the DSP/CPU 3A, and then the audio signals are outputted from the DSP/CPU 3A.

The display unit 6A comprises a display such as a color Liquid Crystal Display (LCD) and the like and a drive circuit for displaying images on the display as well as displays the photographed images based on the image signals outputted from the DSP/CPU 3A.

The key-in part 7A is not only for inputting basic instructions such as the photographing (shooting) button, but also for outputting transfer instructions of the photography mode setting information inputted by the user to the DSP/CPU 3A.

The DSP/CPU 3A controls operation of the digital camera 10 according to the directions inputted by the user through the key-in part 7A. Specifically, the DSP/CPU 3A is a microcomputer, dedicated processor or the like which outputs the image signals outputted from the unit circuit 5A to the display unit 6A, the audio signals outputted from the image signals or audio processing part 8A are compressed/expanded for outputting to the address data bus 9A and reference clock signals are outputted to the timing generator 4A.

The address data bus 9A is a bus which each other interconnect the DSP/CPU 3A, the DRAM 10A, the built-in flash memory 11A and the card interface 12A.

The DRAM 10A is a buffer memory in which the image signals and the audio signals outputted from the DSP/CPU 3A are temporarily stored sequentially through the address data bus 9A. In addition, the DRAM 10A comprises the working memory function of the DSP/CPU 3A.

The built-in flash memory 11A is the memory in which the control program and data for executing various processing including an automatic focus control (AF) and an automatic exposure control (AE) by the DSP/CPU 3A are stored.

The memory card 13A is the memory in which the image signals and the audio signals outputted from the DSP/CPU 3A are stored through the address data bus 9A, and enables attachment and detachment to/from the digital camera 10.

The card interface 12A is used to install the memory card 13A to the digital camera 10.

The communication interface 14A is the interface which connects the USB cable 30 or the like and the digital camera 10.

Figure 3:
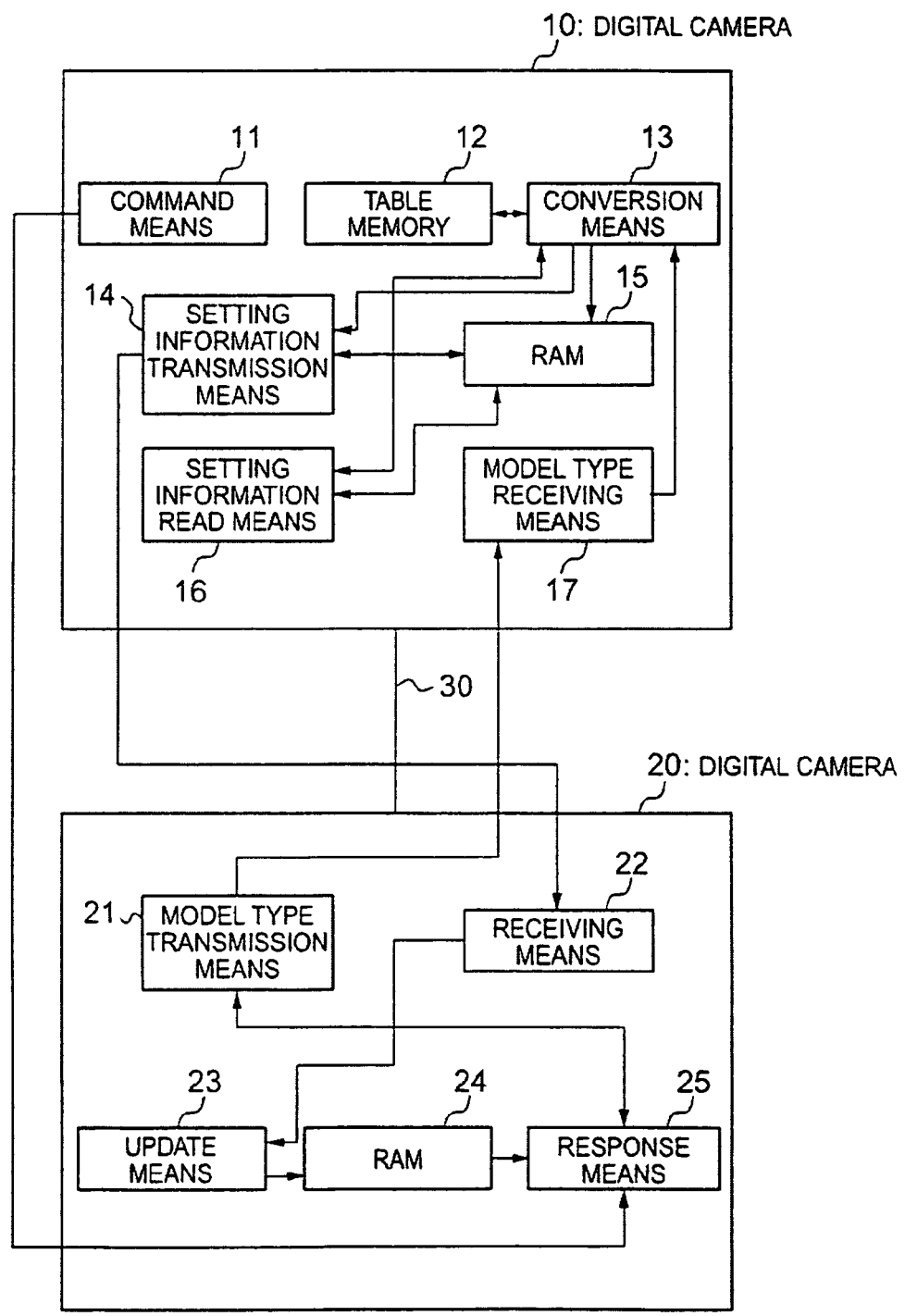
FIG. 3 is a functional block diagram showing the exemplary internal configuration of the digital camera 10 and the digital camera 20 shown in FIG. 1.

FIG. 3 is a functional block diagram showing the exemplary internal configuration of the digital camera 10 and the digital camera 20 shown in FIG. 1.

The digital camera 10 comprises a command means 11, a table memory 12, a conversion means 13, setting information transmission means 14, a RAM 15, a setting information reading means 16, and a model type receiving means 17, which will be described below.

The table memory 12 is the memory in which compatible conversion values of the photography mode setting information corresponding to model types and the model type of the digital camera are stored and is equivalent to the built-in flash memory 11A shown in FIG. 2. The details of the setting information will later be explained using FIG. 5.

The RAM 15 is the memory in which the photography mode setting information of the digital camera 10 is stored and equivalent to the built-in flash memory 11A shown in FIG. 2. In addition, the RAM 15 is the memory for temporary storage of the photography mode setting information converted with the conversion means and is equivalent to the DRAM 10A shown in FIG. 2.

The command means 11 commands the digital camera 20 to transmit the model type to the digital camera 20 side which is executed by the transfer instructions of the photography mode setting information from the user and is equivalent to the DSP/CPU 3A shown in FIG. 2.

The model type receiving means 17 receives the model type of the digital camera 20 transmitted from the digital camera 20 side according to a command from the command means 11, outputs the model type to the conversion means 13 and is equivalent to the communication interface 14A shown in FIG. 2.

The setting information reading means 16 reads the photography mode setting information of the digital camera 10 stored in the RAM 15 according to the instructions from the conversion means 13, outputs the setting information to the conversion means 13 and is equivalent to the DSP/CPU 3A shown in FIG. 2.

The conversion means 13 converts the photography mode setting information set in the digital camera 10 outputted from the setting information reading means 16 into photography mode setting information that can be applied to the digital camera 20, outputs this information to the setting information transmission means 14 while reading the compatible conversion values by referring to the table memory 12 based on the digital camera 20 model type outputted from the model type receiving means 17 and is equivalent to the DSP/CPU 3A shown in FIG. 2

The photography mode setting information which after conversion is temporarily stored in RAM 15 is read and transmitted to the digital camera 20 side according to a command from the conversion means 13. The setting information transmission means 14 is equivalent to the communication interface 14A shown in FIG. 2.

The digital camera 20 comprises a model type transmission means 21, a receiving means 22, an updating means 23, a RAM 24, and a response means 25, which will be described below.

The RAM 24 is the memory in which the photography mode setting information of the digital camera 20 is stored and is equivalent to the built-in flash memory 11A shown in FIG. 2.

The response means 25 reads the model type of the digital camera 20 stored in the RAM 24 according to a command from the command means 11, outputs the model type to the model type transmission means 21 and is equivalent to the DSP/CPU 3A shown in FIG. 2.

The model type transmission means 21 inputs the model type of the digital camera 20 outputted from the response means 25, transmits the model type to the digital camera 10 side and is equivalent to the communication interface 14A shown in FIG. 2.

The receiving means 22 receives the photography mode setting information transmitted from the setting information transmission means 14, outputs this information to the updating means 23 and is equivalent to the communication interface 14A shown in FIG. 2.

The updating means 23 updates the photography mode setting information stored in the RAM 24 into the photography mode setting information outputted from the receiving means 22 and is equivalent to the DSP/CPU 3A shown in FIG. 2.

FIGS. 4 and 5 show example settings of the photography mode setting information of the digital camera 10 shown in FIG. 1 and the like.

In FIGS. 4 and 5, as a plurality of scenes, "1: PERSON(s) AND SCENERY 1," "2: PERSON(s) AND SCENERY 2," "3: CLOSE-UP," "4: BUST CLOSE-UP," "5: KNEE SHOT," "6: TWO-PERSONS SHOT," "7: CLOSE-UP OF FLOWERS," "8: FLOWER FIELD," "9: FOREST," "10: AUTUMN LEAVES," "11: BLUE SKY," "12: SUNSET," "13: SUMMER OCEAN," "14: NIGHT SCENE," "15: SLOW SYCHRONIZATION 1," "16: SLOW SYCHRONIZATION 2," "17: FIREWORKS," "18: NIGHT SKY," "19. LIGHT TRACE," "20: FLOWING WATER," "21: STILL WATER," "22: ACTION," "23: BUILDING," "24: FOOD," "25: CUSTOM 1," "26: CUSTOM 2," "27: CUSTOM 3," "28: CUSTOM 4," and "29: CUSTOM 5" are illustrated. Furthermore, for each of these scenes, a sample image is correlated and the user can observe these sample images in a glimpse to see how the photographed image was projected. Also, these sample images may be previously set as well as the user may set images photographed in various photographic modes as sample images.

In addition, each setting information shown in FIG. 4 can contain both sides of those which are previously set in the digital cameras 10 and 20 prior to the time of shipment (for example, scenes 1 to 24) and those which the user of the digital cameras 10 and 20 can set (for example, scenes 25 to 29).

In addition, as setting information, "FOCUS AF," "SHUTTER SPEED," "APERTURE," "EV SHIFT," "SENSITIVITY," "FILTER," "EXPOSURE MODE," "PHOTOMETRY METHOD," "WHITE BALANCE (WB)," "COLOR ENHANCEMENT," "FLASH LIGHT VOLUME," "SHARPNESS," "COLOR SATURATION," "CONTRAST," and "FLASH" are illustrated.

Moreover, the above-mentioned setting information are examples and it is possible to include various setting entries other than these, such as "BRIGHTNESS," "COLOR BALANCE," "GAMMA VALUE," "COLOR SPACE SPECIFICATION," and "RECORD SIZE." For example, the "COLOR SPACE SPECIFICATION" is the setting information for specifying the color space applied at the time of image processing according to the color space applied for the generation timing of the image data, such as for sRGB color space or NTSC color space. The "RECORD SIZE" is the setting information for interpolating the difference in the number of pixels between the digital cameras 10 and 20.

FIG. 6 is a drawing showing an example setting of the setup information related to scene "25: NIGHT SCENE 2" the user set as "25: CUSTOM 1" shown in FIG. 5.

In addition to the setting information stored in the digital camera 10 side which in FIGS. 4 and 5 only shows a portion of the setting information, appended in FIG. 6 shows an example of the setting information according to the scene "25: NIGHT SCENE 2," which is converted so that the settings can be applied in the digital camera 20 side.

The setting information stored in the digital camera 10 side is shown as follows: for example, "2 SECONDS" as the shutter speed, "F8" as the aperture (F value), "0" as the EV (Exposure Value), "RED EMPHASIS +10%" as the white balance, for example, "90%" as the flash light volume (light intensity), "SKIN COLOR ENHANCEMENT 15%" as the color enhancement, "+4 UNITS" as the contrast, and "+5 UNITS" as the sharpness.

The setting information converted so that the setting can be applied in the digital camera 20 side is shown as follows: for example, "1.8 SECONDS" as the shutter speed, "F8" as the aperture (F value), "0" as the EV (Exposure Value), "RED EMPHASIS +15%" as the white balance, for example, "85%" as the flash light volume, "SKIN COLOR ENHANCEMENT 10%" as the color enhancement, "+5 UNITS" as the contrast, and "+6 UNITS" as the sharpness.

When setting information is set by a user, it is not necessary for all items shown in FIG. 4 to be set. In addition, specific numerical values such as the shutter speed can be input. Further, in order to improve operability at the time of setting, several modes are already prepared and the user can select from these as well.

As mentioned above, the setting information according to the scene "25: NIGHT SCENE 2" varies depending on the model type of the digital camera and the setting information related to other scenes differs similarly. In this embodiment, after converting the photography mode setting information that can be applied to the transmission destination photography mode setting information in the digital camera 20, the converted setting information is then transmitted to the digital camera 20.

FIG. 7 is a drawing showing a conversion table example which is referred to when converting the parameter values of the color enhancement setting information set in the digital camera 10 as shown in FIG. 1 and the like into the parameter values of the color enhancement that can be applied to the digital camera 20. This conversion table is stored in the table memory 12 shown in FIG. 3.

FIG. 7 shows the state corresponding to the degree of color enhancement of red and green stored in the digital camera 10 and the digital camera 20. In this table, the degree of enhancement required in the digital camera 20 is 10% lower than the degree of enhancement required in the digital camera 10. For example, when the degree of enhancement of red is "+5%" in the digital camera 10 the corresponding enhancement level of red is "+4.5%" in the digital camera 20.

In other words, when photographing a predetermined scene which requires the degree of enhancement of red to be set as "+5%" in the digital camera 10, the same degree of enhancement of red needed is set at "+4.5%" in the digital camera 20. Otherwise, the image quality intended in the digital camera 10 will not be obtained in the image photographed by the digital camera 20. For example, red and green will be too emphasized in the image shot by the digital camera 20.

Accordingly, preceding transmission of the photography mode setting information from the digital camera 10 to the digital camera 20, the photography mode setting information set in the digital camera 10 is converted into each setting information value of the digital camera 20 by referring to the conversion table as shown in FIG. 7.

In addition, similarly when "NATURAL COLOR MODE 3" is set in the digital camera 10, this setting is compatible with "NATURAL COLOR MODE 2" set in the digital camera 20. As a result, the proportion in the degree of enhancement and the like will be the same and either of the digital cameras 10 and 20 can be set at the numerical value for the same level of detail of the other by auto setting. Also, in such a case, it is possible to suitably convert the setting information by regulating the conversion table of FIG. 7 Moreover, because it is redundant to have a table with all the values necessary to convert the setting information values, when this conversion can be based on a certain recognizable pattern (in this case, the value of the setting information in the digital camera 10 is multiplied by 0.9) as shown in the conversion table of the degree of color enhancement shown in FIG. 7, the value can be calculated (multiplied by 0.9) and converted.

Further, for example, when the degree of enhancement of red which is not included in the table is set in the digital camera 10, the setting information can also be calculated by performing interpolation from the table values with the closest setting value. In this manner, it is only necessary to store representative values, thereby attaining reduction and simplification of the table capacity.

Further, updated conversion values can be provided from the manufacturer's side to users through a network such as the Internet. That is, in this case the conversion values can be updated by the user connecting the digital camera 10 or the like to a network and performing the required operation.

Description of the Operation

Figure 8:
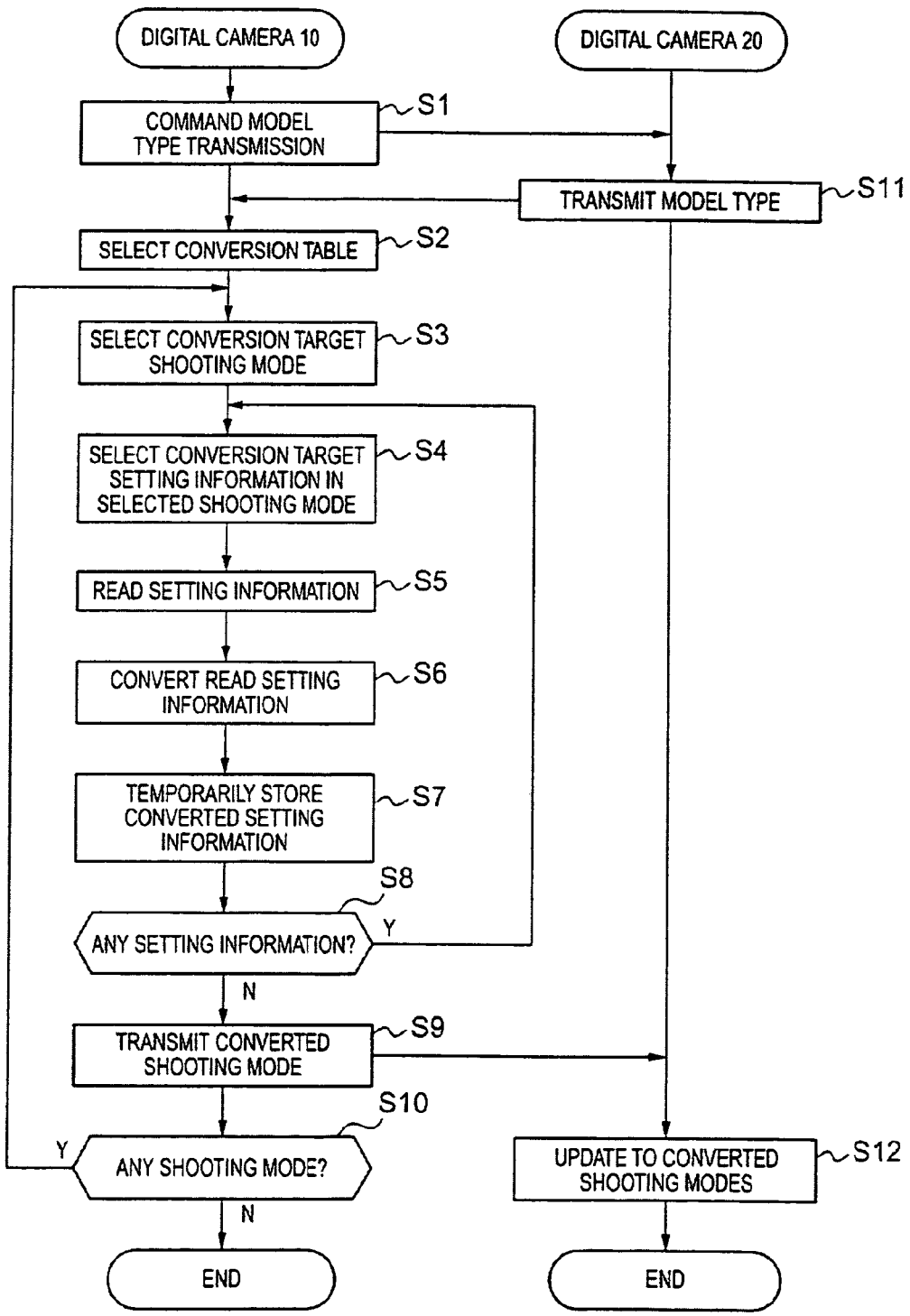
FIG. 8 is a flowchart showing the operation of the digital cameras 10 and 20 shown in FIGS. 1 and 3.

FIG. 8 is a flowchart showing the operation of the digital cameras 10 and 20 shown in FIGS. 1 and 3. Here, the sequential transformation of all photography mode setting information in the digital camera 10 is shown in FIG. 4 and FIG. 5, and the case whereby conversion of all the setting information is completed and transferred to the digital camera 20 from the photography mode will be explained in the example.

In addition, by necessity after converting all the photography mode setting information of the digital camera 10, it is possible to transmit this information to the digital camera 20 as one packet. Also, after converting only particular photography mode setting information which the user specified among all photography mode setting information of the digital camera 10, this partial information can be transmitted to the digital camera 20.

First, in the state in which the digital camera 10 and the digital camera 20 are connected by the USB cable 30 or the like, the power source of both sides of the digital cameras 10 and 20 are switched "ON." In this state, the command means 11 commands the digital camera 20 to transmit the model type of the digital camera 20 (Step S1).

Then, in the digital camera 20, according to a command form the command means 11, the response means 25 reads the model type of the digital camera 20 stored in the RAM 24 and outputs the model type to the model type transmission means 21.

The model type transmission means 21 transmits the model type of the digital camera 20 outputted from the response means 25 to the digital camera 10 (Step S11).

Next, in the digital camera 10, the model type receiving means 17 receives the model type of the digital camera 20 transmitted from the model type transmission means 21 and outputs the model type to the conversion means 13.

The conversion means 13 selects the conversion values of the photography mode setting information corresponding to the model type of the digital camera 20 by referring to the table memory 12 based on the model type of the digital camera 20 outputted from the model type receiving means 17 (Step S2).

Subsequently, the conversion means 13 directs the setting information reading means 16 to read the photography modes stored in the RAM 15.

The setting information reading means 16 reads the photography modes stored in the RAM 15 according to the direction from the conversion means 13 and outputs the photography modes to the conversion means 13.

The conversion means 13 selects the photography mode for conversion with reference to the photography mode output from the setting information reading means 16 (Step S3).

In this case, the photography modes are sequentially converted from the photography mode with the lowest scene number shown in FIGS. 4 and 5. In addition, because sequential transformation of all the photography mode setting information of the digital camera 10 shown in FIGS. 4 and 5 is performed and transfers all of the completed conversion setting information to the digital camera 20 from the photography mode, when Step S3 is first executed the "PERSON(s) AND SCENERY 1" assigned to scene No. 1 is selected, and in the case of second execution of Step S3 the "PERSON(s) AND SCENERY 2" assigned to scene No. 2 will be selected.

Next, the conversion means 13 selects the setting information intended for conversion of the mode information selected and outputs the selection results to the setting information reading means 16 (Step S4).

Here, each of the setting information shown in FIGS. 4 and 5 is converted in order from the side illustrated on left side into the side illustrated on the right side. Therefore, when first executing Step S4, "FOCUS AF" will be selected, and in the case of the second execution of Step S4 "SHUTTER SPEED" will be selected.

Subsequently, the setting information reading means 16 reads the setting information intended for conversion from the RAM 15 according to the selection results outputted from the conversion means 13 and outputs this setting information to the conversion means 13 (Step S5).

Then, the conversion means 13 converts the setting information read by the setting information reading means 16 based on the conversion values stored in the conversion table selected in Step S2, in order for the setting information to be applied in the digital camera 20 (Step S6).

Then, the conversion means 13 temporarily stores the converted setting information in the RAM 15 (Step S7).

Next, the conversion means 13 judges whether or not there is non-converted setting information in the photography mode setting information selected in Step S3 and accordingly converts the non-converted information (Step S8).

As a result of the decision in Step S8, when there is setting information to be converted, a loop executing Steps S4 to S7 is formed and all photography mode setting information requiring conversion is converted.

On the other hand, when there is no setting information required to be converted as a result of the judgment of Step S8 because all of the photography mode setting information has been converted, the conversion means 13 commands transmission of the photography mode setting information subsequent to conversion and temporarily stored in the RAM 15 to the digital camera 20 in conjunction with the setting information transmission means 14.

The setting information transmission means 14 reads the converted photography mode setting information from the RAM 15 according to a command from the conversion means 13 and transmits the converted setting information to the digital camera 20 (Step S9).

Then, in the digital camera 20, the receiving means 22 receives the photography mode setting information transmitted by the setting information transmission means 14 and outputs the setting information to the updating means 23.

The photography mode setting information outputted from the receiving means 22 is inputted into the updating means 23. Then, the updating means 23 updates the photography mode setting information set in the digital camera 20 to the setting information of the photography mode outputted from the receiving means 22 (Step S12).

Meanwhile, in the digital camera 10, the conversion means 13 judges whether or not the photography mode has any non-converted setting information, that is, judges whether or not there is any photography mode setting information required to be converted (Step S10).

As a result of the judgment in Step S10, when there is any photography mode setting information required to be converted, a loop executing Steps S3 to S9 is formed and all photography mode setting information which should be converted is converted.

Meanwhile, as a result of the decision in Step S10, when there is no photography mode setting information required to be converted, the processing shown in FIG. 8 is completed.

In this embodiment, when transmitting the photography mode setting information after conversion, a combined sample image based on the photography mode setting information before conversion can be transmitted together with a sample image based on the photography mode setting information after conversion and transmitted in Step S9. Accordingly, even if the photography mode setting information of another model is transmitted to a user, these sample images can be easily observed in a glimpse to see how the photographed images were projected.

Second Embodiment

Description of the Configuration

Figure 9:
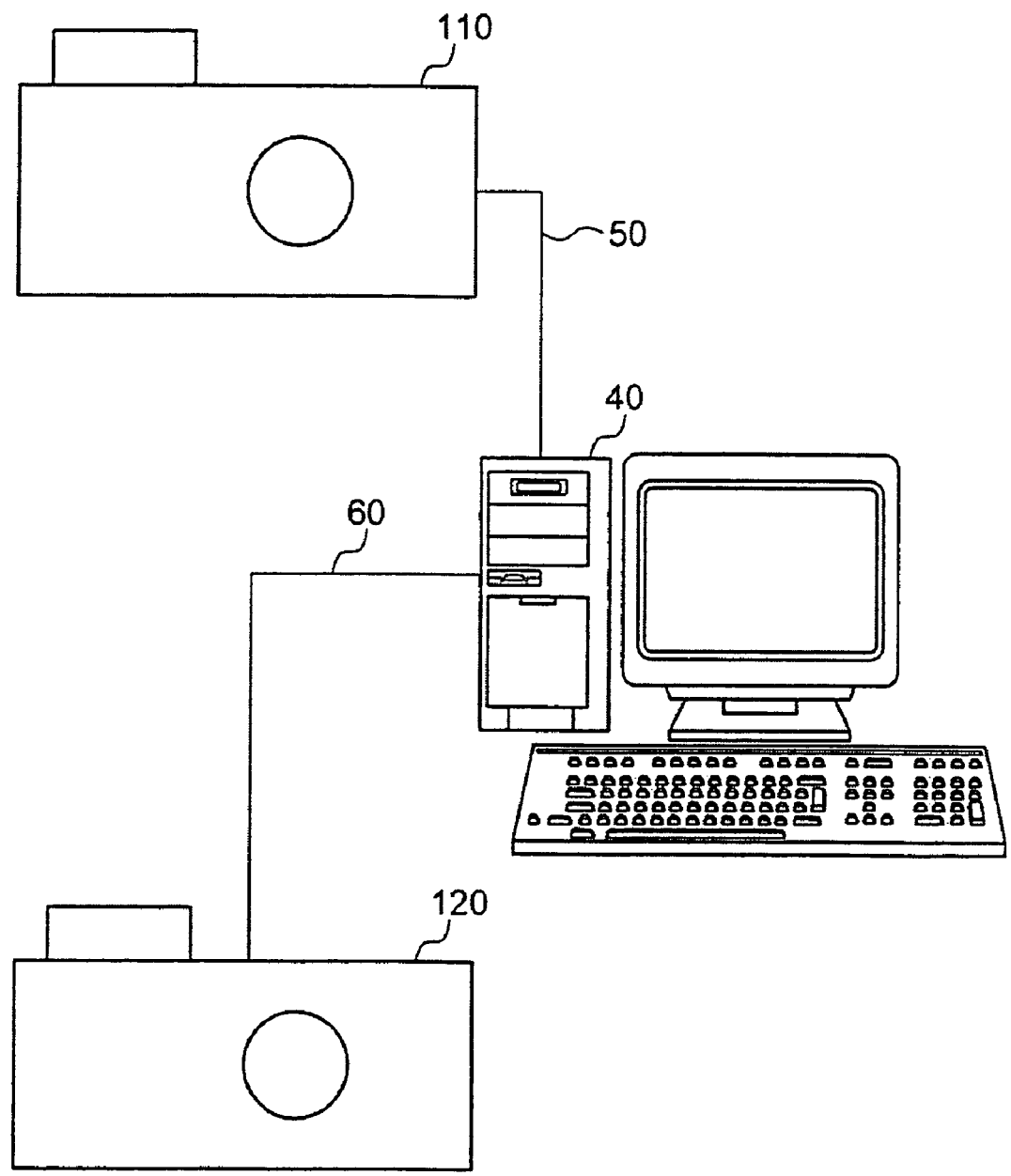
FIG. 9 is an exemplary configuration drawing of the photography mode setting information transfer system according to the second embodiment of the present invention.

FIG. 9 is an exemplary configuration drawing of the photography mode setting information transfer system according to the second embodiment of the present invention.

FIG. 9 shows the photography mode setting information transfer system, which transfers photography mode setting information by transmitting the photography mode setting information set in a digital camera 110 from the digital camera 110 to a personal computer 40, an information processor through a USB cable 50, converting the photography mode setting information set in the digital camera 110 into photography mode setting information capable of being used in a digital camera 120 at the personal computer 40, and transmitting the converted setting information to the digital camera 120 through a USB cable 60.

As in the first embodiment, instead of at least one of the USB cables 50 and 60, infrared, cable/wireless LAN or the like can be used to connect the digital camera 110/the digital camera 120 and the personal computer 40.

Figure 10:
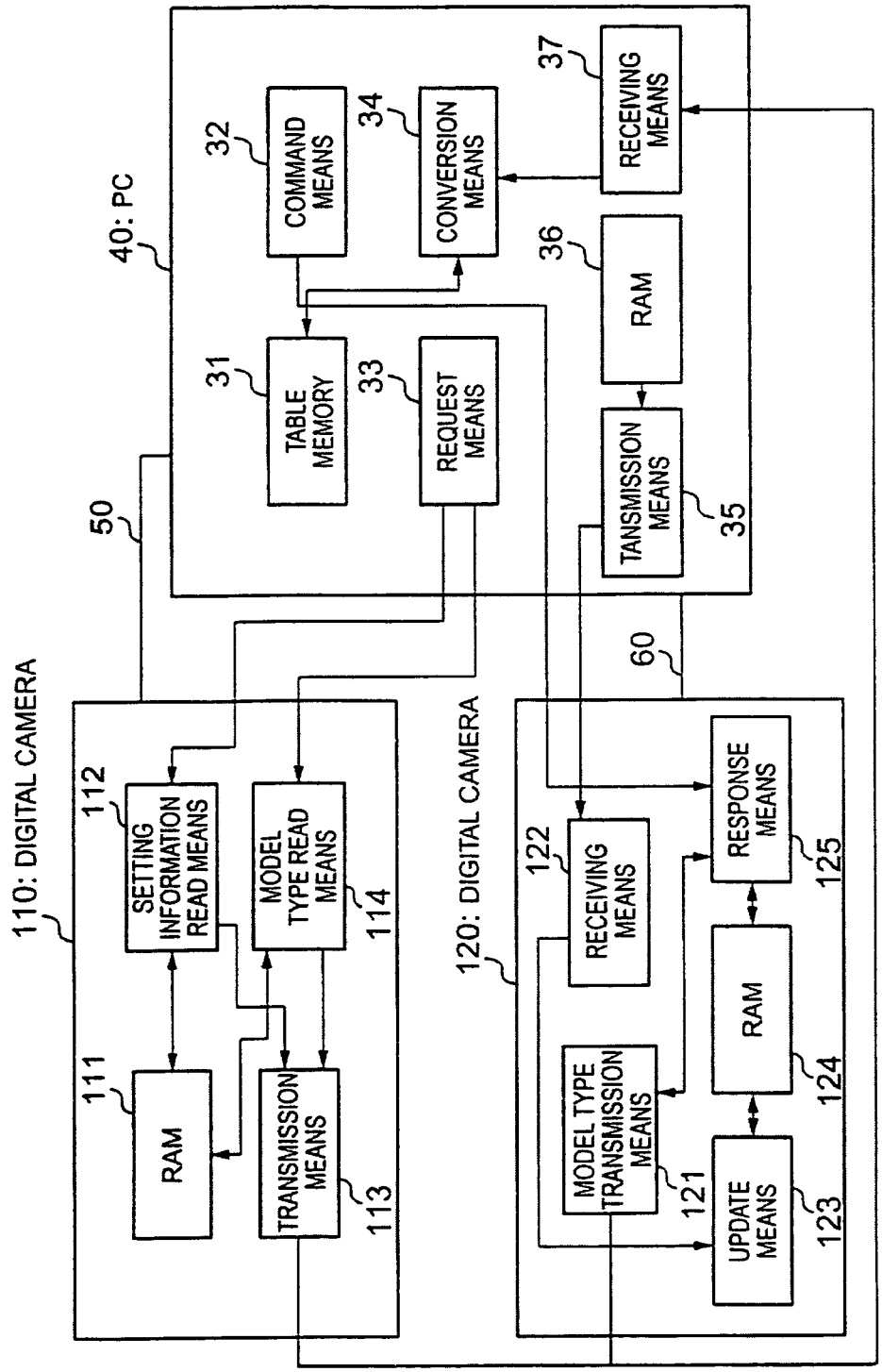
FIG. 10 is a function block diagram showing the exemplary internal configuration of the digital camera 110, the digital camera 120 and the personal computer (PC) 40 shown in FIG. 9.

FIG. 10 is a function block diagram showing the exemplary internal configuration of the digital camera 110, the digital camera 120 and the personal computer (PC) 40 shown in FIG. 9;

The digital camera 110 comprises a RAM 111, a setting information reading means 112, a transmission means 113, and a model type reading means 114, which will be described below.

The RAM 11 is the memory in which the photography mode setting information of the digital camera 110 is set. The RAM 111 corresponds to the built-in flash memory 11A shown in FIG. 2.

The setting information reading means 112 reads the photography mode photography mode setting information stored in the RAM 111 and outputs the setting information to the transmission means 113 according to a command from the personal computer 40 side. The setting information reading means 112 corresponds to the DSP/CPU 3A shown in FIG. 2.

The model type reading means 114 reads the model types stored in the RAM 111 and outputs the model type to the transmission means 113 according to a command from the personal computer 40 side. The model type reading means 114 corresponds to the DSP/CPU 3A shown in FIG. 2.

The transmission means 113 transmits the photography mode setting information of the digital camera 110 outputted from the setting information reading means 112 and the model type of the digital camera 110 output from the model type reading means 114 to the personal computer 40 side. The transmission means 113 corresponds to the communication interface 14A shown in FIG. 2.

The digital camera 120 comprises a model type transmission means 121, a receiving means 122, an updating means 123, a RAM 124, and a response means 125, which will be described below.

The RAM 124 is a memory in which setting information of photography modes of the digital camera 120 is stored. The RAM 124 corresponds to the built-in flash memory 11A shown in FIG. 2.

The response means 125 reads the model type of the digital camera 120 stored in the RAM 124 and outputs the model type to the model type transmission means 121 according to a command from the personal computer 40 side.

The model type transmission means 121 inputs the model type of the digital camera 120 outputted from the response means 125 and transmits the model type to the personal computer 40 side.

The receiving means 122 receives the photography mode setting information transmitted from the personal computer 40 side and outputs the setting information to the updating means 123. The receiving means 122 corresponds to the communication interface 14A shown in FIG. 2.

The updating means 123 updates the photography mode setting information stored in the RAM 124 to the photography mode setting information outputted from the receiving means 122. The updating means 123 corresponds to the DSP/CPU 3A shown in FIG. 2.

The personal computer 40 comprises a table memory 31, a command means 32, a request means 33, a conversion means 34, a transmission means 35, a RAM 36, and a receiving means 37 which will be described as follows.

The table memory 31 is a memory in which the model types of the digital cameras from and to which the photography mode setting information is transmitted and conversion values of the photography mode setting information corresponding to the model types are stored correspondingly.

The RAM 36 stores the photography mode setting information set in the digital camera 110 received by the receiving means 37, and temporarily stores the photography mode setting information converted by the conversion means 34.

The command means 32 commands the digital camera 120 side to transmit the model type of the digital camera 120 taking an opportunity of user's transfer direction of the photography mode setting information.

The request means 33 requests the digital camera 110 side to transmit the photography mode setting information set in the digital camera 110 and the model type of the digital camera 110 taking an opportunity of user's transfer direction of the photography mode setting information.

The receiving means 37 receives the photography mode setting information of the digital camera 110 and the model type of the digital camera 110 transmitted from the digital camera 110 according to the request from the request means 33, outputs the photography mode setting information of the digital camera 110 to the conversion means 34 and outputs the model type of the digital camera 110 to the conversion means 34.

In addition, the receiving means 37 receives the model type of the digital camera 120 transmitted from the digital camera 120 side according to a command from the command means 32 and outputs the model type to the conversion means 34.

The conversion means 34 reads corresponding conversion values with reference to the table memory 31 based on the model types of the digital cameras 110 and 120 outputted from the receiving means 37 and converts the photography mode setting information set in the digital camera 110 to the photography mode setting information capable of being applied in the digital camera 120.

The transmission means 35 reads the converted photography mode setting information temporarily stored in the RAM 36 and transmits the converted setting information to the digital camera 120 side according to command from the conversion means 34.

Description of the Operation

Figure 11:
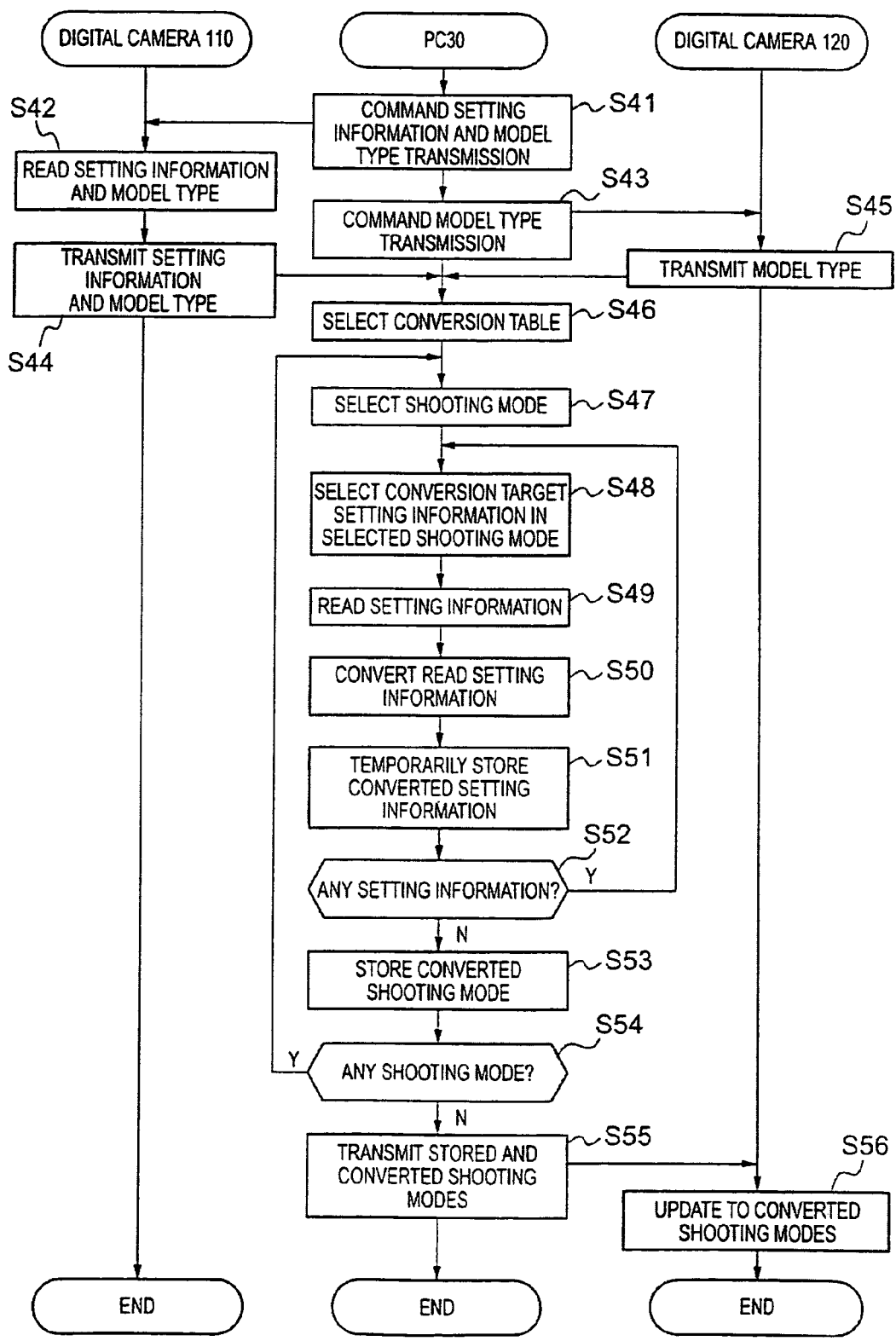
FIG. 11 is a flowchart showing the operation of the digital cameras 110 and 120 and the personal computer 40 shown in FIGS. 9 and 10.

FIG. 11 is a flowchart showing the operation of the digital cameras 110 and 120 and the personal computer 40 shown in FIGS. 9 and 10.

The description will hereinafter pertain to the case wherein all photography mode setting information shown in FIGS. 4 and 5 is transferred from the digital camera 110 to the digital camera 120.

First, in the state in which the digital camera 110 and the personal computer 40 are connected by the USB cable 50 or the like, the digital camera 120 and the personal computer 40 are connected by the USB cable 60 or the like, the power source of both sides of the digital cameras 110 and 120 are switched "ON." In this state, the request means 33 requests the digital camera 110 to transmit the photography mode setting information of the digital camera 110 (Step S41).

Then, in the digital camera 110, according to a request from the request means 33, the setting information reading means 112 reads the photography mode setting information of the digital camera 110 stored in the RAM 111 and outputs the setting information to the transmission means 113, and the model type reading means 114 reads the model type of the digital camera 110 stored in the RAM 111 and outputs the model type to the transmission means 113 (Step S42).

The transmission means 113 transmits the photography mode setting information of the digital camera 110 outputted from the setting information reading means 112 and the model type of the digital camera 110 outputted from the model type reading means 114 to the personal computer 40 (Step S44).

In the personal computer 40, the receiving means 37 receives the photography mode setting information of the digital camera 110 and the model type of the digital camera 110, which are transmitted from the transmission means 113, outputs the model type of the digital camera 110 to the conversion means 34, and stores the photography mode setting information of the digital camera 110 in the RAM 36.

Further, in the personal computer 40, the command means 32 commands the digital camera 120 to transmit the model type of the digital camera 120 (Step S43).

Then, in the digital camera 120, according to the command from the command means 32, the response means 125 reads the model type of the digital camera 120 stored in the RAM 124 and outputs the model type to the model type transmission means 121.

The model type transmission means 121 transmits the model type of the digital camera 120 output from the response means 125 to the personal computer 40 (Step S45).

Next, in the personal computer 40, the receiving means 37 receives the model type of the digital camera 120 transmitted from the model type transmission means 121 and outputs the model type to the conversion means 34.

The conversion means 34 selects the conversion values used in converting the photography mode setting information of the digital camera 110 to the photography mode setting information capable of being applied in the digital camera 120 with reference to the table memory 31 based on the model type of the digital camera 110 and the model type of the digital camera 120 output from the receiving means 37 (Step S46).

Subsequently, the conversion means 34 reads the photography modes set in the digital camera 110 which are stored in the RAM 15, and selects the intended photography mode setting information for conversion (Step S47).

The selection method is similar to in the first embodiment. When Step S47 is first executed, the "PERSON(s) AND SCENERY 1" assigned to scene No. 1 is selected. When Step S47 is secondly executed, the "PERSON(s) AND SCENERY 2" assigned to scene No. 2 is selected.

Next, the conversion means 34 selects the setting information intended for conversion (Step S48).

The selection method is similar to in the first embodiment. When Step S48 is first executed first, the "FOCUS AF" is selected. When Step S48 is secondly executed, the "SHUTTER SPEED" is selected.

Subsequently, the conversion means 34 reads the setting information intended for conversion selected in Step S48 from the RAM 15 (Step S49).

Then, the conversion means 34 converts the setting information read in Step S49 to the setting information capable of being applied in the digital camera 120 based on the conversion values stored in the conversion table selected in Step S46 (Step S50).

Then, the conversion means 34 temporarily stores the converted setting information in the RAM 36 (Step S51).

Next, the conversion means 34 judges whether or not there is setting information required to be converted (Step S52).

As a result of the judgment in Step S52, when there is setting information required to be converted, a loop executing Steps S48 to S51 is formed to convert all photography mode setting information.

Meanwhile, as a result of the judgment in Step S52, when there is no setting information required to be converted and all photography mode setting information has been converted, the conversion means 36 commands the setting information transmission means transmission means 35 to continue to temporarily store the converted photography mode setting information which is temporarily stored in the RAM 36 (Step S53).

Then, in the personal computer 40, the conversion means 34 judges whether or not there is any photography mode setting information required to be converted (Step S54).

As a result of the judgment in Step S54, when there is any photography mode setting information is required to be converted, a loop executing Steps S47 to S53 is formed to convert the all photography mode setting information.

Meanwhile, as a result of the judgment in Step S54, when there is no photography mode setting information required to be converted, all intended photography mode setting information has been converted. Therefore, a command is given that the converted photography mode setting information which is temporarily stored in the RAM 36 is to be transmitted to the digital camera 120.

According to the command from the conversion means 34, the setting information transmission means 35 reads the converted photography mode setting information stored in the RAM 36 and transmits the converted setting information to the digital camera 120 (Step S55).

Then, in the digital camera 120, the receiving means 122 receives the photography mode setting information transmitted from the transmission means 35 and outputs the setting information to the updating means 123.

The updating means 123 inputs the photography mode setting information outputted from the receiving means 122 and updates the photography mode setting information set in the digital camera 120 into the photography mode setting information outputted from the receiving means 122 (Step S56). Since the all photography mode setting information has been converted and transmitted, the process shown in FIG. 11 is completed.

In this embodiment, the case wherein the portion corresponding to the setting information reading means 16 described in the first embodiment is built into the conversion means 34 has been described. However, it is possible that the portion corresponding to the setting information reading means 16 is separately provided as in the first embodiment.

Further, also in this embodiment, it is possible that when the converted photography mode setting information is transmitted in Step S55, sample images based on the converted photography mode setting information are transmitted to prompt users to check the image.

Third Embodiment

Description of the Configuration

Figure 12:
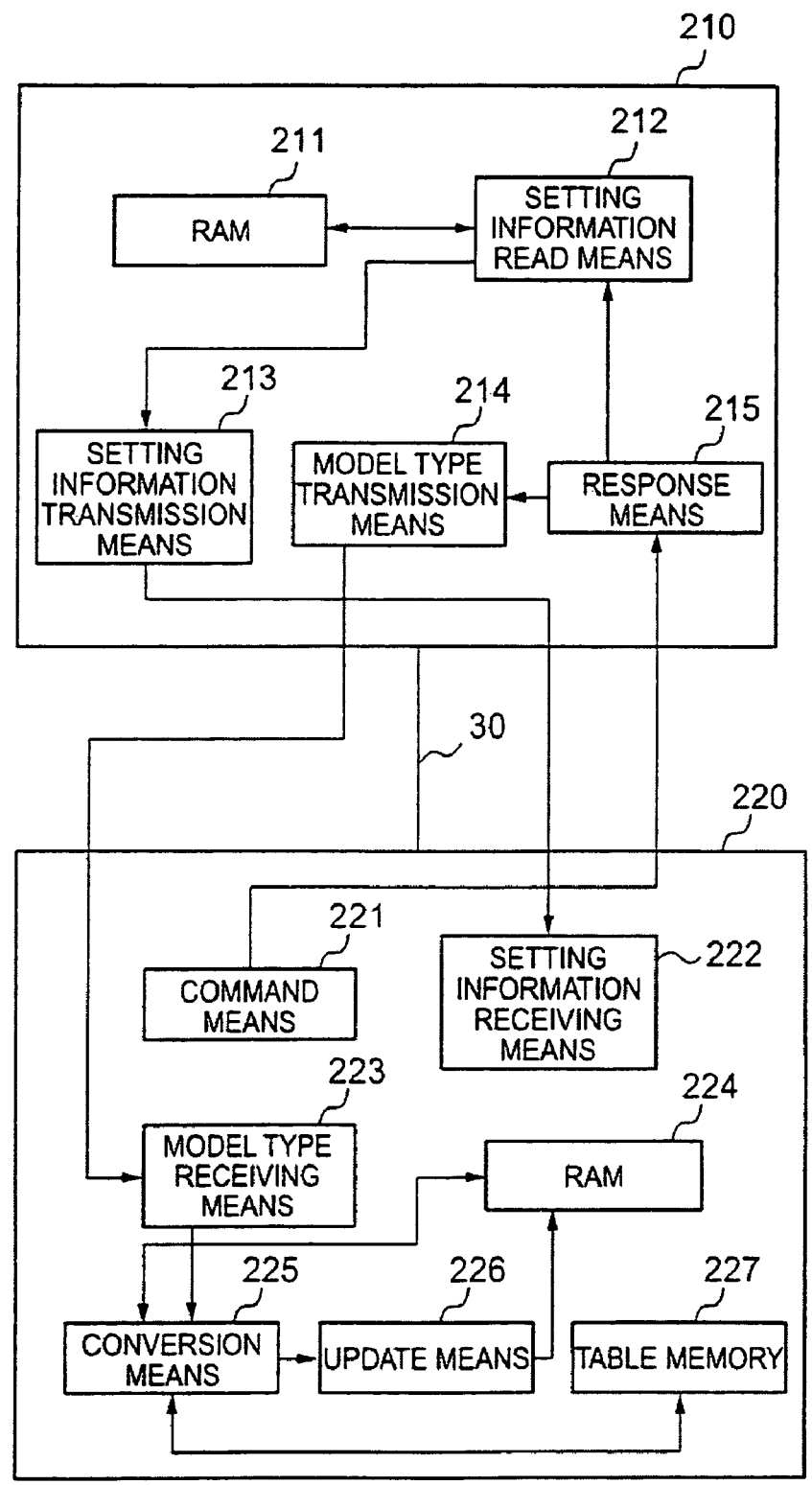
FIG. 12 is a function block diagram showing an exemplary internal configuration of the digital camera 210 and the digital camera 220 in the photography mode setting information transfer system according to the third embodiment of the present invention.

FIG. 12 is a function block diagram showing an exemplary internal configuration of the digital camera 210 and the digital camera 220 in the photography mode setting information transfer system according to the third embodiment of the present invention. FIG. 12 shows the photography mode setting information transfer system which transfers setting information of photography modes by transmitting the photography mode setting information set in the digital camera 210 from the digital camera 210 through the USB cable 30, and converting in the digital camera 220 the photography mode setting information set in the digital camera 210 to setting information of photography modes capable of being used in the digital camera 220.

As in the first embodiment, instead of the USB cable 30, infrared, cable/wireless LAN or the like can be used to connect the digital camera 210 and the digital camera 220.

The digital camera 210 comprises a RAM 211, a setting information reading means 212, a setting information transmission means 213, a model type transmission means 214, and a response means 215, which will be described as follows.

The RAM 211 is a memory in which the photography mode setting information of the digital camera 210 is stored. The RAM 211 corresponds to the built-in flash memory 11A shown in FIG. 2.

The response means 215 commands the setting information reading means 212 to output the photography mode setting information set in the digital camera 210 and a model type of the digital camera 210 to the digital camera 220 side according to command from the digital camera 220 side. The response means 215 corresponds to the DSP/CPU 3A shown in FIG. 2.

The setting information reading means 212 reads the photography mode setting information stored in the RAM 211 and outputs the setting information to the setting information transmission means 213 according to the command from the response means 215. The setting information reading means 212 corresponds to the DSP/CPU 3A shown in FIG. 2.

The setting information transmission means 213 transmits the photography mode setting information output from the setting information reading means 212 to the digital camera 220 side. The setting information transmission means 213 corresponds to the communication interface 14A shown in FIG. 2.

The model type transmission means 214 transmits the model type of the digital camera 210 output from the response means 215 to the digital camera 220 side. The model type transmission means 214 corresponds to the communication interface 14A shown in FIG. 2.

The digital camera 220 comprises a command means 221, a setting information receiving means 222, a model type receiving means 223, a RAM 224, a conversion means 225, an updating means 226 and a table memory 227.

The table memory 227 is the memory in which model types of the digital camera and conversion values of the photography mode setting information corresponding to the model types are correspondingly stored. The RAM 15 corresponds to the built-in flash memory 11A and the DRAM 10A shown in FIG. 2.

The RAM 224 is the memory in which setting information of photography modes of the digital camera 220 is stored. The RAM 224 corresponds to the built-in flash memory 11A shown in FIG. 2.

The command means 221 commands the digital camera 210 side to transmit the photography mode setting information and the model type of the digital camera 210, taking an opportunity of user's transfer direction of the photography mode setting information. The command means 221 corresponds to the DSP/CPU 3A shown in FIG. 2.

The setting information receiving means 222 receives the photography mode setting information transmitted from the digital camera 210 side and temporarily stores the setting information in the RAM 224. The setting information receiving means 222 corresponds to the communication interface 14A shown in FIG. 2.

The model type receiving means 223 receives the model type transmitted from the digital camera 210 side, and outputs the model type to the conversion means 225. The model type receiving means 223 corresponds to the communication interface 14A shown in FIG. 2.

The conversion means 225 reads corresponding conversion values with reference to the table memory 227 based on the model type of the digital camera 210 which is output from the model type receiving means 223, converts the photography mode setting information of the digital camera 210 which is temporarily stored in the RAM 224 to the photography mode setting information capable of being used in the digital camera 220, and outputs the converted setting information to the updating means 226. The conversion means 225 corresponds to the DSP/CPU 3A shown in FIG. 2.

The updating means 226 updates the photography mode setting information of the digital camera 220 which is stored in the RAM 224 to the photography mode setting information output from the conversion means 225. The updating means 226 corresponds to the DSP/CPU 3A shown in FIG. 2.

Description of the Operation

Figure 13:
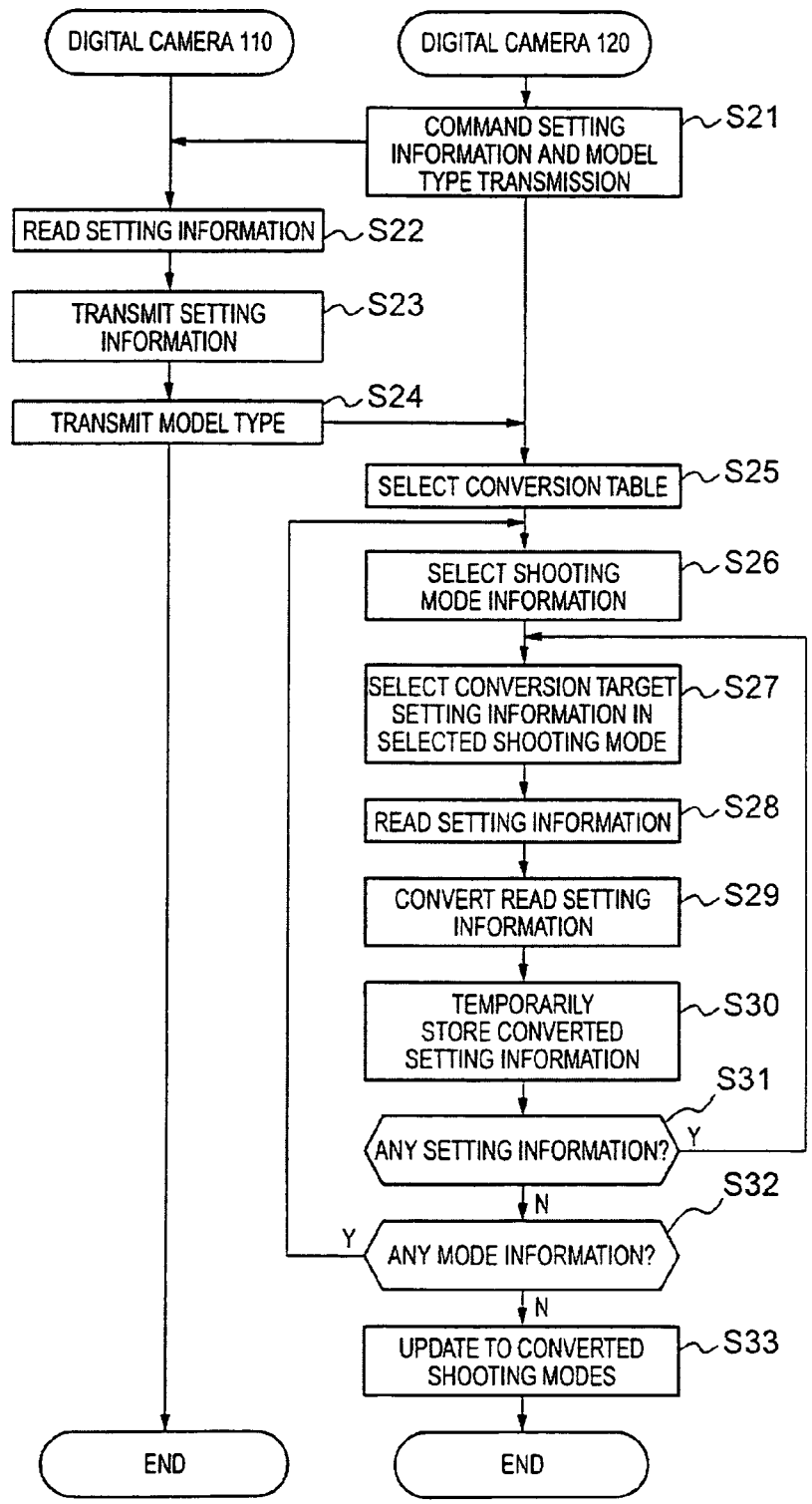
FIG. 13 is a flowchart showing the operation of the digital cameras 210 and 220 shown in FIG. 12.

FIG. 13 is a flowchart which shows operation of the digital cameras 210 and 220 shown in FIG. 12. Descriptions will be hereinafter given of a case wherein all photography mode setting information shown in FIGS. 4 and 5 is transferred from the digital camera 210 to the digital camera 220 as an example.

First, in the state in which the digital camera 210 and the digital camera 220 are connected by the USB cable 30 or the like, the power source of both sides of the digital cameras 210 and 220 are switched "ON." In this state, the command means 221 commands the digital camera 220 to transmit the photography mode setting information and the model type of the digital camera 210 (Step S21).

Then, in the digital camera 210, according to the command from the command means 221, the response means 215 commands the setting information reading means 212 to read the photography mode setting information of the digital camera 210 stored in the RAM 211 and output the setting information to the setting information transmission means 213.

According to the command of the response means 215, the setting information reading means 212 reads the photography mode setting information of the digital camera 210 stored in the RAM 211 and outputs the setting information to the setting information transmission means 213 (Step S22).

The setting information transmission means 213 transmits the photography mode setting information of the digital camera 210 output from the setting information reading means 212 to the digital camera 220 (Step S23).

In the digital camera 220, the setting information receiving means 222 receives the photography mode setting information of the digital camera 210 transmitted from the setting information transmission means 213, and stores the setting information in the RAM 224.

Subsequently, in the digital camera 210, according to command from the command means 221, the response means 215 reads the model type of the digital camera 210 stored in the RAM 211 and outputs the model type to the model type transmission means 214.

The model type transmission means 214 transmits the model type of the digital camera 210 output from the response means 215 to the digital camera 220 (Step S24).

In the digital camera 220, the model type receiving means 223 receives the model type of the digital camera 210 transmitted from the model type transmission means 214, and outputs the model type to the conversion means 225.

The conversion means 225 selects conversion values used in converting the photography mode setting information set in the digital camera 210 to the setting information capable of being used in the digital camera 220 with reference to the table memory 227 based on the model type of the digital camera 210 output from the model type receiving means 223 (Step S25).

Subsequently, the conversion means 225 reads the photography modes set in the digital camera 210 stored in the RAM 224 and selects the photography mode setting information intended for conversion (Step S26).

The selection method is similar to in the first embodiment. When Step S26 is first executed first, the "PERSON(s) AND SCENERY 1" assigned to scene No. 1 is selected. When Step S26 is secondly executed secondly, the "PERSON(s) AND SCENERY 2" assigned to scene No. 2 is selected.

Next, the conversion means 225 selects the conversion target setting information in the selected mode information (Step S27).

The selection method is similar to in the first embodiment. When Step S27 is first executed, the "FOCUS AF" is selected. When Step S27 is secondly executed, the "SHUTTER SPEED" is selected.

Subsequently, the conversion means 225 reads the setting information selected in Step S27 from the RAM 224 (Step S28).

Then, the conversion means 225 converts the setting information read in Step S28 to the setting information capable of being applied in the digital camera 220 based on the conversion values stored in the conversion table selected in Step S25 (Step S29).

Then, the conversion means 225 temporarily stores the converted setting information in the RAM 224 (Step S30).

Next, the conversion means 225 judges whether or not there is setting information required to be converted (Step S31).

As a result of the decision in Step S31, when there is setting information required to be converted, a loop executing Steps S27 to S30 is formed to convert the all photography mode setting information intended for conversion.

Meanwhile, as a result of the judgment in Step S31, when there is no setting information required to be converted, the all photography mode setting information has been converted. The conversion means 225 judges whether or not there is any photography mode setting information required to be converted (Step S32).

As a result of the judgment in Step S32, when there is any photography mode setting information required to be converted, a loops executing Steps S26 to S31 is formed to convert all photography mode setting information.

Meanwhile, as a result of the judgment in Step S32, when there is no photography mode setting information required to be converted, all photography mode setting information has been converted. Therefore, the process shown in FIG. 13 is completed.

In this embodiment, when the photography mode setting information is transmitted in Step S23, it is possible that sample images based on the converted photography mode setting information are transmitted to prompt users to check the image.

Operation of the digital cameras 10, 20 and the like described in the foregoing respective embodiments can be stored in a storage medium and the like as a program by which the computer built in the digital cameras 10, 20 and the like operates.

Further, in the foregoing embodiments, descriptions have been given using a digital camera as an example. However, the present invention can be also applied to other imaging devices such as a digital still camera and a video camera (movie camera).

While the present invention has been described with reference to the preferred embodiments, it is intended that the invention be not limited by any of the details of the description thereof.

As this invention can be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A photography mode setting information transfer system which transfers photography mode setting information indicating a correspondent relationship of each of a plurality of photographic scenes and a plurality of photographic parameters of each photographic scene from a first imaging device to a second imaging device, the system comprising:

first setting information storage means, in the first imaging device, for storing the photography mode setting information appropriate for characteristics of the first imaging device;

first photography condition setting means, in the first imaging device, for automatically setting the plurality of photographic parameters corresponding to a photographic scene when photographing using the photography mode setting information stored by the first setting information storage means;

conversion information storage means, in the first imaging device, for storing conversion information for converting the correspondent relationship of each of the plurality of photographic scenes and the plurality of photographic parameters of each photographic scene based on model types of a plurality of imaging devices;

first receiving means, in the first imaging device, for receiving a model type of a main unit of the second imaging device from the second imaging device;

conversion means, in the first imaging device, for: (i) reading conversion information from the conversion information storage means corresponding to the model type of the second imaging device received by the first receiving means, and (ii) converting the correspondent relationship of each of the plurality of photographic scenes and the plurality of photographic parameters of each photographic scene included in the photography mode setting information stored by the first setting information storage means based on the read conversion information;

setting information transmission means, in the first imaging device, for transmitting the photography mode setting information converted by the conversion means to the second imaging device;

model type transmission means, in the second imaging device, for transmitting the model type of the main unit of the second imaging device to the first imaging device;

second receiving means, in the second imaging device, for receiving the photography mode setting information transmitted by the setting information transmission means;

second setting information storage means, in the second imaging device, for storing the photography mode setting information received by the second receiving means; and second photography condition setting means, in the second imaging device, for automatically setting the plurality of photographic parameters corresponding to a photographic scene when photographing using the photography mode setting information stored by the second setting information storage means.

2. The photography mode setting information transfer system according to claim 1, wherein the first imaging device and the second imaging device are connected using any of USB, infrared or cable/wireless local area network.

3. The photography mode setting information transfer system according to claim 1, further comprising transmission request means, in the first imaging device, for conducting a transmission request of the model type to the second imaging device.

4. The photography mode setting information transfer system according to claim 1, further comprising setting information update means for updating and storing the photography mode setting information received by the second receiving means to the photography mode setting information stored in the second setting information storage means.

5. The photography mode setting information transfer system according to claim 4, wherein the setting information update means further updates and stores a correspondent relationship of a new photographic scene and a plurality of photographic parameters thereof received by the second receiving means to the photography mode setting information which indicates the correspondent relationship of each of the plurality of photographic scenes and the plurality of photographic parameters of each photographic scene stored in the second setting information storage means.

6. An imaging device comprising:
   setting information storage means for storing photography mode setting information that is appropriate for characteristics of the imaging device and that indicates a correspondent relationship of each of a plurality of photographic scenes and a plurality of photographic parameters of each photographic scene;
   photography condition setting means for automatically setting the plurality of photographic parameters corresponding to a photographic scene when photographing using the photography mode setting information stored in the setting information storage means;
   conversion information storage means for storing conversion information for converting the correspondent relationship of each of the plurality of photographic scenes and the plurality of photographic parameters of each photographic scene based on model types of a plurality of imaging devices;
   first receiving means for receiving a model type of a main unit of another imaging device;
   conversion means for: (i) reading conversion information from the conversion information storage means corresponding to the model type of the other imaging device received by the first receiving means, and (ii) converting the correspondent relationship of each of the plurality of photographic scenes and the plurality of photographic parameters of each photographic scene included in the photography mode setting information stored by the setting information storage means based on the read conversion information; and
   setting information transmission means for transmitting the photography mode setting information converted by the conversion means to the other imaging device.

7. The imaging device according to claim 6, further comprising:
   model type transmission means for transmitting a model type of a main unit of the imaging device to the other imaging device;
   second receiving means for receiving photography mode setting information transmitted from the other imaging device; and
   setting information update means for updating the photography mode setting information stored in the setting information storage means based on the photography mode setting information received by the second receiving means.

8. The imaging device according to claim 6, wherein the setting information update means updates and stores the photography mode setting information received by the second receiving means to the photography mode setting information stored in the setting information storage means.

9. The imaging device according to claim 8, wherein the setting information update means updates and stores a correspondent relationship of a new photographic scene and a plurality of photographic parameters thereof received by the second receiving means to the photography mode setting information which indicates the correspondent relationship of each of the plurality of photographic scenes and the plurality of photographic parameters of each photographic scene stored in the setting information storage means.

10. The imaging device according to claim 6, wherein a plurality of photographic parameters from among shutter speed, aperture, exposure value shift, white balance, flash light intensity, color enhancement, contrast, sharpness, focus condition and photometry method, are stored as the plurality of photographic parameters corresponding to each photographic scene.

11. The imaging device according to claim 6, wherein a plurality of photographic scenes from among a photographic scene of photographing a person, a photographic scene of photographing scenery, a photographic scene of photographing a person and scenery, plural photographic scenes with different close-up parts of a person, plural photographic scenes with different photographic scenery objects, and plural photographic scenes with different scenery conditions, are stored as the plurality of photographic scenes included in the photography mode setting information.

12. The imaging device according to claim 6, wherein the conversion information storage means stores conversion information as a combination of values for a plurality of photographic parameters between a plurality of different model types corresponding to a predetermined photographic scene.

13. The imaging device according to claim 6, wherein the conversion information storage means stores conversion information values between a plurality of different model types corresponding to a predetermined photographic parameter.

14. A photography mode setting information transfer method comprising:
   a first setting information storage step of storing photography mode setting information that is appropriate for characteristics of a first imaging device and that indicates a correspondent relationship of each of a plurality of photographic scenes and a plurality of photographic parameters of each photographic scene;
   a first photography condition setting step of automatically setting the plurality of photographic parameters corresponding to a photographic scene when photographing using the photography mode setting information stored in the first setting information storage step;
   a conversion information storage step of storing conversion information for converting the correspondent relationship of each of the plurality of photographic scenes and the plurality of photographic parameters of each photographic scene based on model types of a plurality of imaging devices;
   a first receiving step of receiving a model type of a main unit of a second imaging device from the second imaging device;
   a conversion step of: (i) reading conversion information stored in the conversion information storage step corresponding to the model type of the second imaging device received in the first receiving step, and (ii) converting the correspondent relationship of each of the plurality of photographic scenes and the plurality of photographic parameters of each photographic scene included in the photography mode setting information stored in the first setting information storage step based on the read conversion information;

a setting information transmission step of transmitting the photography mode setting information converted in the conversion step to the second imaging device;

a model type transmission step of transmitting the model type of the main unit of the second imaging device to the first imaging device;

a second receiving step of receiving the photography mode setting information transmitted in the setting information transmission step;

a second setting information storage step of storing the photography mode setting information received in the second receiving step; and a second photography condition setting step of automatically setting the plurality of photographic parameters corresponding to a photographic scene when photographing using the photography mode setting information stored in the second setting information storage step.

15. A storage medium having a program stored thereon that is executable by computers of a first imaging device and a second imaging device to cause the first imaging device and the second imaging device perform a photography mode information transfer process comprising:

a first setting information storage step of storing photography mode setting information that is appropriate for characteristics of the first imaging device and that indicates a correspondent relationship of each of a plurality of photographic scenes and a plurality of photographic parameters of each photographic scene;

a first photography condition setting step of automatically setting the plurality of photographic parameters corresponding to a photographic scene when photographing using the photography mode setting information stored in the first setting information storage step;

a conversion information storage step of storing conversion information for converting the correspondent relationship of each of the plurality of photographic scenes and the plurality of photographic parameters of each photographic scene based on model types of a plurality of imaging devices;

a first receiving step of receiving a model type of a main unit of the second imaging device from the second imaging device;

a conversion step of: (i) reading conversion information stored in the conversion information storage step corresponding to the model type of the second imaging device received in the first receiving step, and (ii) converting the correspondent relationship of each of the plurality of photographic scenes and the plurality of photographic parameters of each photographic scene included in the photography mode setting information stored in the first setting information storage step based on the read conversion information;

a setting information transmission step of transmitting the photography mode setting information converted in the conversion step to the second imaging device;

a model type transmission step of transmitting the model type of the main unit of the second imaging device to the first imaging device;

a second receiving step of receiving the photography mode setting information transmitted in the setting information transmission step;

a second setting information storage step of storing the photography mode setting information received in the second receiving step; and a second photography condition setting step of automatically setting the plurality of photographic parameters corresponding to a photographic scene when photographing using the photography mode setting information stored in the second setting information storage step.

16. A storage medium having a program stored thereon that is executable by a computer of an imaging device to perform a process comprising:

a setting information storage step of storing photography mode setting information that is appropriate for characteristics of the imaging device and that indicates a correspondent relationship of each of a plurality of photographic scenes and a plurality of photographic parameters of each photographic scene;

a photography condition setting step of automatically setting the plurality of photographic parameters corresponding to a photographic scene when photographing using the photography mode setting information stored in the setting information storage step;

a conversion information storage step of storing conversion information for converting the correspondent relationship of each of the plurality of photographic scenes and the plurality of photographic parameters of each photographic scene based on model types of a plurality of imaging devices;

a receiving step of receiving a model type of a main unit of another imaging device;

a conversion step of: (i) reading conversion information stored in the conversion information storage step corresponding to the model type of the other imaging device received in the receiving step, and (ii) converting the correspondent relationship of each of the plurality of photographic scenes and the plurality of photographic parameters of each photographic scene included in the photography mode setting information stored in the setting information storage step based on the read conversion information; and a setting information transmission step of transmitting the photography mode setting information converted in the conversion step to the other imaging device.

* * * * *

UNITED STATES PATENT AND TRADEMARK OFFICE
CERTIFICATE OF CORRECTION

PATENT NO.       : 7,602,419 B2                                    Page 1 of 1
APPLICATION NO.  : 10/869669
DATED            : October 13, 2009
INVENTOR(S)      : Toshihoro Kiuchi It is certified that error appears in the above-identified patent and that said Letters Patent is hereby corrected as shown below:

Column 25, line 66 (claim 8, line 1), change "6" to --7--.

Signed and Sealed this

First Day of June, 2010

David J. Kappos
*Director of the United States Patent and Trademark Office*